US011223981B2

(12) United States Patent
Wu

(10) Patent No.: US 11,223,981 B2
(45) Date of Patent: Jan. 11, 2022

(54) MANAGING INTER-RADIO ACCESS TECHNOLOGY CAPABILITIES OF A USER EQUIPMENT

(71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/639,023

(22) PCT Filed: Aug. 22, 2019

(86) PCT No.: PCT/US2019/047750
§ 371 (c)(1),
(2) Date: Feb. 13, 2020

(87) PCT Pub. No.: WO2020/041618
PCT Pub. Date: Feb. 27, 2020

(65) Prior Publication Data
US 2020/0275323 A1    Aug. 27, 2020

Related U.S. Application Data

(60) Provisional application No. 62/722,061, filed on Aug. 23, 2018.

(51) Int. Cl.
H04W 36/00    (2009.01)
H04W 4/00     (2018.01)
(Continued)

(52) U.S. Cl.
CPC ....... H04W 36/0058 (2018.08); H04W 36/14 (2013.01); H04W 72/048 (2013.01)

(58) Field of Classification Search
CPC ............. H04W 36/0058; H04W 36/14; H04W 72/048
(Continued)

(56) References Cited

U.S. PATENT DOCUMENTS 6,125,278 A    9/2000   Wieczorek et al.
6,771,964 B1 * 8/2004  Einola ............... H04W 36/0066
                                                    370/331
(Continued)

FOREIGN PATENT DOCUMENTS

WO    2017034230    3/2017
WO    2018028698    2/2018
(Continued)

OTHER PUBLICATIONS

ETSI TS 136 331 V9.17.0 (Jan. 2014) LTE; Evolved Universal Terrestrial Radio Access (E-UTRA); Radio Resource Control (RRC); Protocol specification (3GPP TS 36.331 version 9.17.0 Release 9), pp. 32 and 200-202 (Year: 2014).*
(Continued)

Primary Examiner — Mark G. Pannell
(74) Attorney, Agent, or Firm — Colby Nipper PLLC

(57) ABSTRACT

Techniques and apparatuses are described for managing inter-radio access technology capabilities of a user equipment. A base station (gNB base station 121) receives a New Radio capability information element (information element 500) that indicates one or more core networks supported by the user equipment (UE 110). Based on the New Radio capability information element, the base station generates a measurement configuration and sends measurement configuration to the user equipment (at 1010). Afterwards, the base station receives one or more measurement results based on the measurement configuration (at 1030). The base station then determines a handover type for the user equipment (at 1105, at 1205, at 1305), and initiates the handover based on the determined handover type (at 1110, at 1210, at 1310).

20 Claims, 23 Drawing Sheets

(51) Int. Cl.
*H04W 36/14* (2009.01)
*H04W 72/04* (2009.01)
(58) Field of Classification Search
USPC .......................................................... 455/436
See application file for complete search history.

(56) References Cited

U.S. PATENT DOCUMENTS

| | | | |
|---|---|---|---|
| 9,226,136 B2 | 12/2015 | Kim et al. | |
| 2011/0256855 A1 | 10/2011 | Wang | |
| 2018/0092085 A1* | 3/2018 | Shaheen | H04W 36/14 |
| 2018/0176710 A1* | 6/2018 | Jang | H04W 24/10 |
| 2018/0220344 A1* | 8/2018 | Shaheen | H04W 36/00837 |
| 2018/0227737 A1 | 8/2018 | Wu | |
| 2018/0332659 A1* | 11/2018 | Hwang | H04W 88/06 |
| 2019/0159088 A1* | 5/2019 | Shi | H04W 36/08 |
| 2019/0261264 A1* | 8/2019 | Lou | H04W 48/18 |
| 2020/0029297 A1* | 1/2020 | Baek | H04W 76/16 |
| 2020/0068630 A1* | 2/2020 | Zhang | H04W 76/10 |

FOREIGN PATENT DOCUMENTS

| | | |
|---|---|---|
| WO | 2018085187 | 5/2018 |
| WO | 2018118788 | 6/2018 |

OTHER PUBLICATIONS

"Consideration on the Capability Coordination for LTE/NR Tight Interworking", 3GPP TSG-RAN WG2 Meeting #97bis, Spokane, USA, Apr. 3-7, 2017, Apr. 2017, 6 pages.
"ETSI TS 123 401 V15.4.0 Jul. 2018", ETSI TS 123 401 V15.4.0 Jul. 2018, Jul. 2018, 412 pages.
"ETSI TS 138 331 V15.2.1", ETSI TS 138 331 V15.2.1 Jun. 2018, Jun. 2018, Jun. 2018.
"International Search Report and Written Opinion", PCT Application No. PCT/US2019/047750, Nov. 18, 2019, 18 pages.
"Pseudo-CR to Introduce 5GCN Capability IE", 3GPP TSG-CT WG1 Meeting #106, Oct. 2017, 3 pages.
"UE Radio Capability for IMS Voice", 3GPP TSG-RAN WG2 AH1807, Jul. 2018, 6 pages.
"5G; NR; Radio Resource Control (RRC); Protocol Specification", 3GPP TS 38.331 version 15.2.1 Release 15, Jun. 2018, 299 pages.
"International Preliminary Report on Patentability", Application No. PCT/US2019/047750, dated Feb. 23, 2021, 10 pages.
"Foreign Office Action", AU Application No. 2019325356, dated Sep. 3, 2021, 3 pages.

* cited by examiner

400 ⟶

```
┌─────────────────────────────────────────────┐
│ Receive, from a base station, a first message that │
│      requests a capability information element     │
│                       402                          │
└─────────────────────────────────────────────┘
                         │
                         ▼
┌─────────────────────────────────────────────────────┐
│ Transmit, to the base station, a second message that (i) includes │
│ the capability information element and (ii) causes the base station │
│ to perform operations that include generating a measurement │
│ configuration and determining to handover the user equipment │
│      based on the capability information-element       │
│                         404                            │
└─────────────────────────────────────────────────────┘
```

Fig. 4

MANAGING INTER-RADIO ACCESS TECHNOLOGY CAPABILITIES OF A USER EQUIPMENT

BACKGROUND

A base station, such as a fifth-generation new-radio base (5GNR) station, may establish a connection with a user equipment (UE). The base station, however, may not know capabilities of the user equipment with respect to inter-radio access technologies. Such capabilities may include an ability to support carrier bands and networks, for example.

In certain instances, measurements performed by the UE may trigger a handover. However, without the base station knowing the capabilities of the UE with respect to inter-radio access technologies, handing over the connection to another base station may fail.

SUMMARY

Techniques and apparatuses are described for managing inter-radio access technology capabilities of a user equipment. A base station receives a New Radio capability information element that indicates one or more core networks supported by the user equipment. Based on the New Radio capability information element, the base station generates a measurement configuration and sends measurement configuration to the user equipment. Afterwards, the base station receives one or more measurement results based on the measurement configuration. The base station then determines a handover type for the user equipment and initiates the handover based on the determined handover type.

In some aspects, a method is described. The method comprises a user equipment receiving, from a base station, a first message that requests a capability information element. In response to receiving the first message, the user equipment transmits, to the base station, a second message that (i) includes the capability information element and (ii) causes the base station to perform operations that include generating a measurement configuration and determining to handover the user equipment.

In some other aspects, another method is described. The method comprises a base station transmitting, to a user equipment, a first message that requests a capability information element. The base station receives, from the user equipment, a second message that includes the capability information element, where the capability information element includes information indicating radio capabilities, supported band information, and a supported network. In response to receiving the response message, and based on the received capability information element, the base station performs operations that include generating a measurement configuration and determining to handover the user equipment.

In one or more aspects, a user equipment indicates New Radio capabilities supported by the user equipment. The user equipment receives a request for a New Radio capability information element. The user equipment then generates a user equipment New Radio capability information element that indicates one or more evolved universal terrestrial radio access core networks supported by the user equipment, where the user equipment implicitly and/or explicitly indicates supported or unsupported core networks as further described. Afterwards, in response to receiving the request, the user equipment communicates the user equipment New Radio capability information element.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of devices and methods associated with managing inter-radio access technology capabilities. The use of the same reference numbers in different instances in the description and the figures may indicate like elements:

FIG. 4 illustrates an example method performed by a base station in accordance with one or more implementations.

FIGS. 6-1 and 6-2 illustrate examples of configurable information elements used by a user equipment to provide an indication of supported or unsupported core network types.

FIGS. 7-1 and 7-2 illustrate examples of configurable information elements used by a user equipment to provide an indication of supported or unsupported core network types.

FIGS. 8-1 and 8-2 illustrate examples of configurable information elements used by a user equipment to provide an indication of supported or unsupported core network types.

FIGS. 9-1 and 9-2 illustrate examples of configurable information elements used by a user equipment to provide an indication of supported or unsupported core network types.

FIGS. 10-1 and 10-2 illustrate examples of configurable information elements and fields used by a user equipment to provide an indication of supported or unsupported core network and/or handover types.

DETAILED DESCRIPTION

Figure 1:
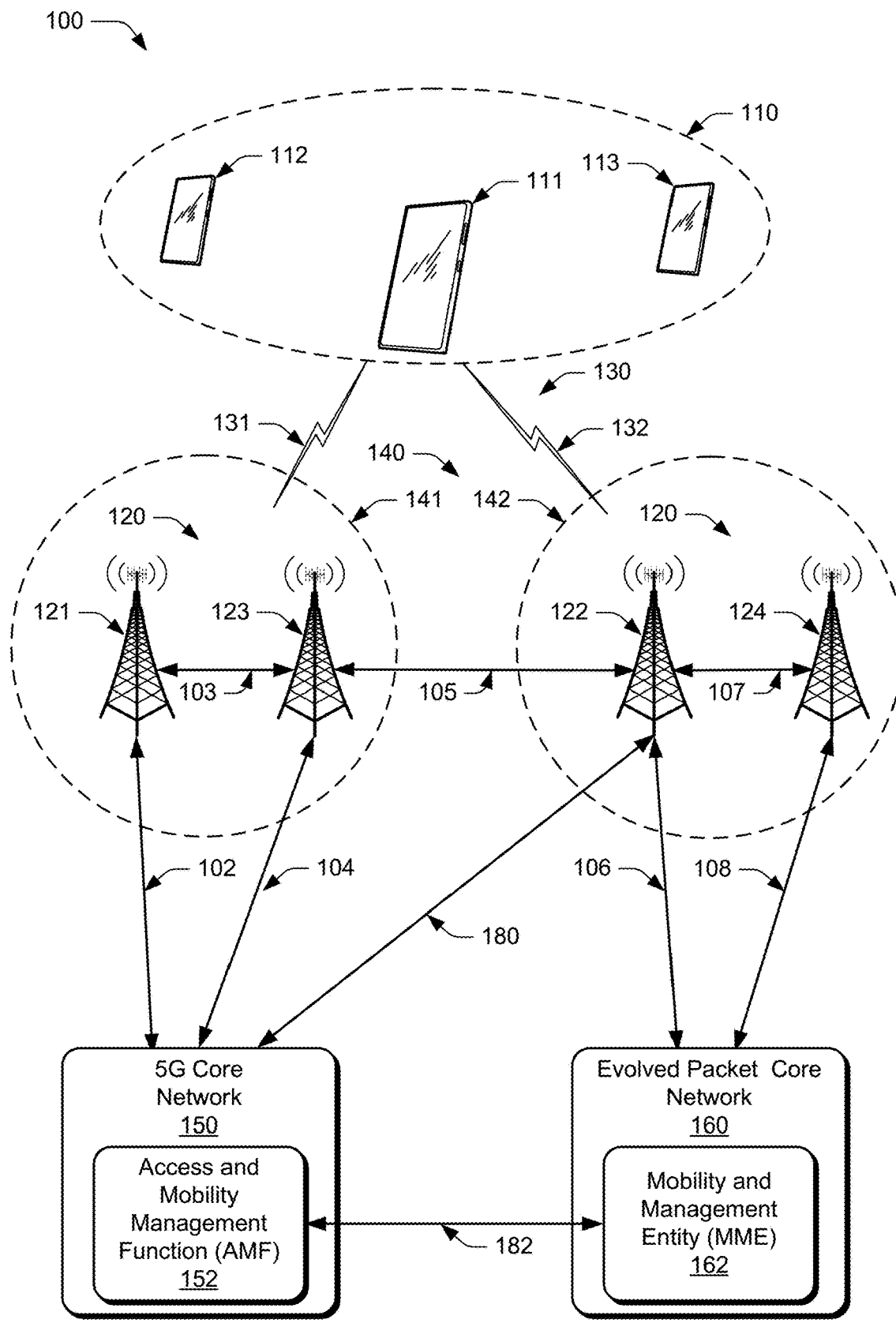
FIG. 1 illustrates an example wireless network environment in which various aspects of managing inter-radio access technology capabilities of a user equipment can be implemented.

This document describes methods and systems as associated with managing inter-radio access technology capabilities of a user equipment. As part of the methods and systems, a user equipment may receive, from a base station, a first message that requests a capability information element. In response to receiving the first message, the user equipment transmits, to the base station, a second message, where the second message includes the capability information element that causes the base station to generate a measurement configuration and determine to handover the user equipment.

A capability manager application is described in this document. The capability manager application may cause the user device to exchange a capability information element with a base station manager and, in general, assist the base station manager in managing inter-radio access technology capabilities Evolving wireless communication systems provide interconnectivity between different radio access technologies (RATs). This interconnectivity poses challenges for the various devices operating in these communication systems, such as for base stations assisting in inter-RAT handovers of a UE. If a base station is unaware of what capabilities the UE has with respect to supported and unsupported RATs, the base station may hand over the UE to an unsupported RAT which, in turn, causes the handover to fail.

In some aspects, a base station receives a New Radio capability information element that indicates one or more core networks supported by a user equipment, such as implicitly indicating supported or unsupported networks and/or explicitly indicating supported or unsupported core networks. The base station generates, based on the New Radio capability information element, a measurement configuration, and sends the measurement configuration to the user equipment. Afterwards, the base station receives one or more measurement results based on the measurement configuration, and determines, based on the one or more core networks supported by the user equipment and the one or more measurement results, a handover type for the user equipment. The base station then initiates the handover of the user equipment based on the determined handover type. This allows the base station to determine what core networks the user equipment supports, and subsequently determine the handover type successfully hand the user equipment over to a base station that implements the supported core networks.

In one or more aspects, a user equipment indicates New Radio capabilities supported by the user equipment. The user equipment receives a request for a New Radio capability information element. The user equipment then generates a user equipment New Radio capability information element that indicates one or more evolved universal terrestrial radio access core networks supported by the user equipment, where the user equipment implicitly and/or explicitly indicates supported or unsupported core networks as further described. Afterwards, in response to receiving the request, the user equipment communicates the user equipment New Radio capability information element. This provides the user equipment with an ability to communicate supported core networks and perform a successful handover between base stations that implement the supported core networks.

Example Environments

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120. In implementations, the AMF 152 and the MME 162 communication with each other via an N26 interface 182.

Example Devices

Figure 2:
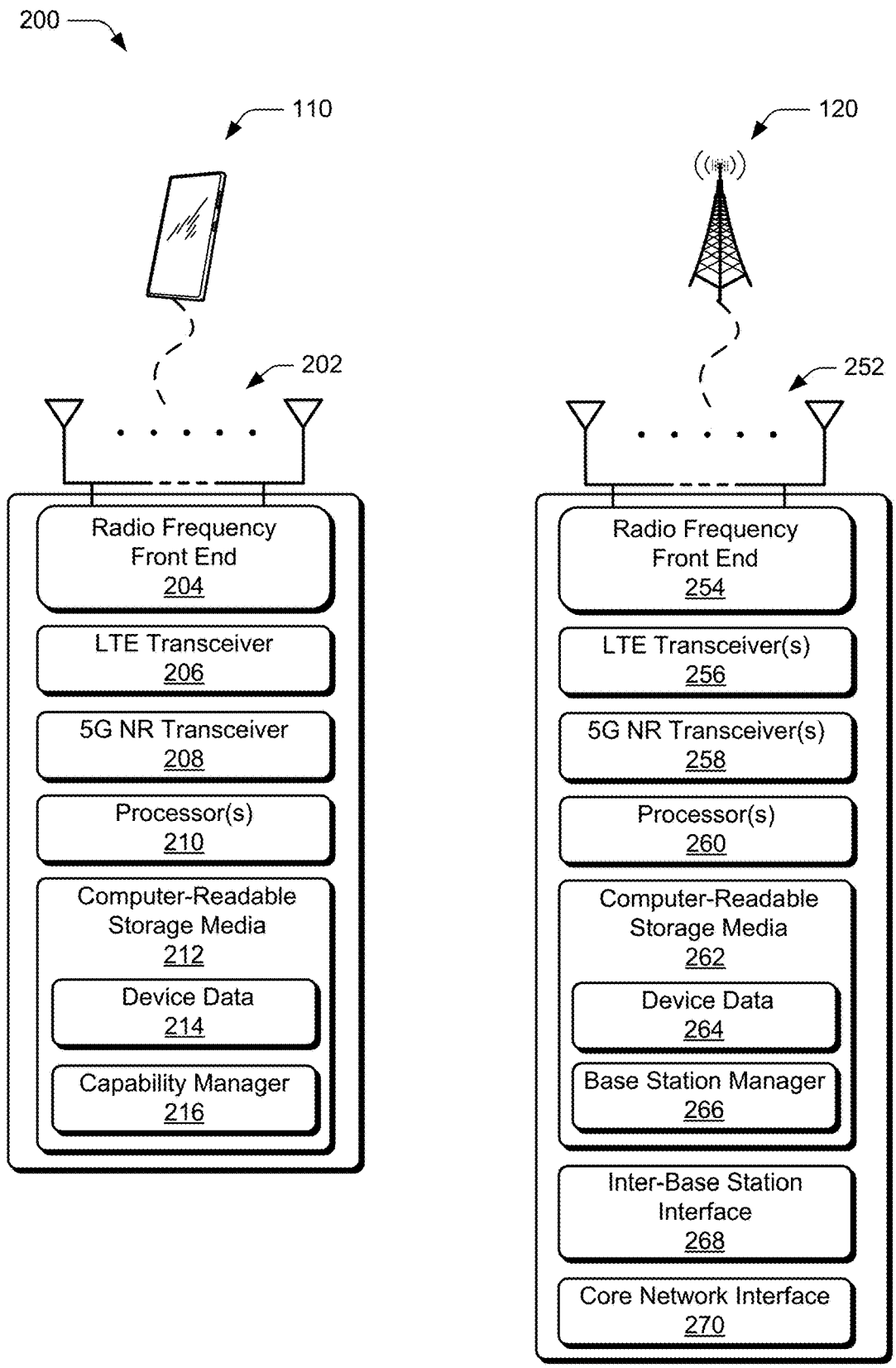
FIG. 2 illustrates an example device diagram for devices that can implement various aspects of managing inter-radio access technology capabilities of a user equipment in accordance with one or more implementations.

FIG. 2 illustrates an example device diagram 200 of devices (e.g., the user equipment 110, one of the base stations 120) that can implement various aspects of managing inter-radio access technology capabilities. The user equipment 110 and/or the base station 120 may include additional functions and interfaces that are omitted from FIG. 2 for the sake of clarity.

The user equipment 110 includes antennas 202, a radio frequency front end 204 (RF front end 204), an LTE transceiver 206, and a 5G NR transceiver 208 for communicating with the base station 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

CRM 212 also includes a capability manager 216. Alternately or additionally, the capability manager 216 is an application, which may be implemented in whole or part as hardware logic or circuitry integrated with or separate from other components of the UE 110. In some aspects, the capability manager 216 may cause the UE 110 to determine a capability information element. In other aspects, the capability manager 216 may cause the UE to manage exchange of messages with the base station 120 that are pertinent to the capability information element.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 include antennas 252, a radio frequency front end 254 (RF front end 254), one or more LTE transceivers 256, and/or one or more 5G NR transceivers 258 for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured similar to, or different from, each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the user equipment 110.

CRM 262 also includes a base station manager 266. Alternately or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the user equipment 110, as well as communication with a core network, such as the core network 150. In at least some aspects, the base station manager 266 may cause the base station 120 to manage exchange of messages with the UE 110 that are pertinent to a capability information element. In other aspects, the base station manager 266 may cause the base station 120 to perform operations based on a received capability information element, including generating a measurement configuration or determining to handover the UE 110.

The base station 120 also include an inter-base station interface 268, such as an Xn and/or X2 interface, which the base station manager 266 configures to exchange user-plane, control-plane, and other information between other base station 120, to manage the communication of the base station 120 with the user equipment 110. The base station 120 include a core network interface 270 that the base station manager 266 configures to exchange user-plane, control-plane, and other information with core network functions and/or entities.

Having described an example environment and example devices that can be utilized for managing inter-RAT capabilities of a UE, consider now a discussion of managing inter-radio access technology capabilities of a user equipment that is in accordance with one or more implementations.

Managing Inter-Radio Access Technology Capabilities of a User Equipment

The evolution of 3GPP introduces enhancements to LTE technologies, such as including support for evolved universal terrestrial radio access (EUTRA) connected to 5GC, alternately referred to as evolved LTE (eLTE). To illustrate, an evolved Node B (eNB) base station that supports EUTRA connected to 5GC is a next-generation eNB (ng-eNB) base station, where the ng-eNB base station connects to a 5GC or to both an EPC and the 5GC. As one example, ng-eNB base station 122 of FIG. 1 connects to 5GC 150 through an NG interface as described at 180, and EPC 160 through an S1 interface at 106. This interconnectivity, however, poses challenges in handing over UEs operating in the inter-RAT environment. For example, a UE supporting EUTRA that is connected to 5GC may or may not support EUTRA connected to EPC. In other words, the UE connected to 5GC may or may not support eLTE. This poses challenges for a 5GC base station (e.g., gNB base station 121) connected to the UE when determining to handover the UE over to a EUTRA base station, such as determining whether to hand the UE over to an ng-eNB base station or to an eNB base station. Without knowledge of what the UE supports (e.g., LTE or eLTE), a base station may select to hand the UE over to an unsupported RAT, thus causing a failed handover. In some implementations, the base station requests capability information from the UE that indicates what RATs the UE supports.

Example methods 300 and 400 are described with reference to FIG. 3 and FIG. 4 in accordance with one or more aspects of performing handovers in an Inter-RAT environment, such as an exchange of capability information between a UE and a base station. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
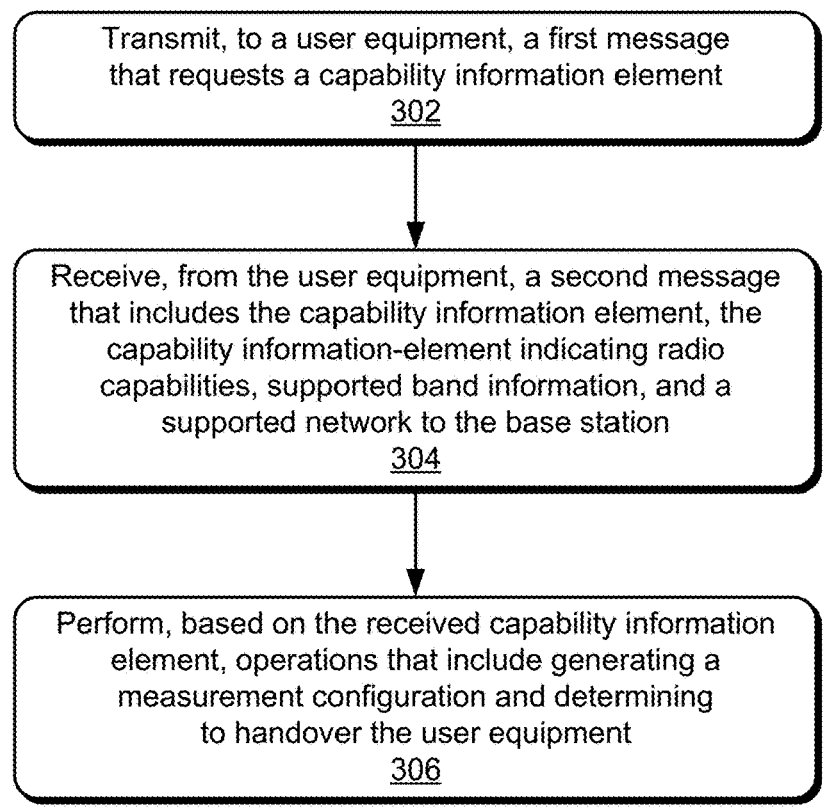
FIG. 3 illustrates an example method performed by a user equipment in accordance with one or more implementations.

FIG. 3 illustrates an example method 300 for determining how to handover a user equipment in an Inter-RAT environment. In some implementations, operations of the method 300 are performed by a base station, such as the base station 121 of FIG. 1.

At 302 the base station transmits, to a UE, a first message that requests a capability information element. The base station (e.g., gNB base station 121), for example, sends a message to the UE (e.g., UE 110) over wireless links (e.g., wireless links 131), where the message includes the request for the capability information element. The requested capability information element may be, in certain instances, a capability information element that is associated with New Radio capabilities, such as one or more of the IEs described with reference to FIGS. 5, 6-1, 6-2, 7-1, 7-2, 8-1, 8-2, 9-1, and/or 9-2.

At 304, the base station receives, from the UE, a second message that includes the capability information element. To illustrate, the base station (e.g., gNB base station 121) receives a message from the UE (e.g., UE 110) over wireless links (e.g., wireless links 131), that includes a UE-NR-Capability IE as further described. The capability information element may indicate, to the base station, radio capabilities of the UE, information related to bands supported by the UE 110, and one or more supported core networks. In implementations, the received capability information element corresponds to any one or more of the IEs described with reference to FIGS. 5, 6-1, 6-2, 7-1, 7-2, 8-1, 8-2, 9-1, 9-2, and/or 10.

At 306, and based on the received capability information element, the base station performs operations that include generating a measurement configuration and determining to handover the UE 110. For instance, the base station (e.g., gNB base station 121) generates the measurement configuration, and includes EUTRA carrier information in the measurement configuration based on the received capability information element.

FIG. 4 illustrates an example method 400 performed by a user equipment in accordance with one or more implementations. The user equipment may be the UE 110 of FIG. 1. In implementations, method 400 works in conjunction, in part or wholly, with method 300.

At 402, the UE receives, from the base station, a first message that requests a capability information element. For example, the UE 110 receives, from the gNB base station 121, a message as described at 302 of method 300. The requested capability information element may be, in certain instances, a capability information element that is associated with New Radio capabilities, such as one or more of the IEs described with reference to FIGS. 5, 6-1, 6-2, 7-1, 7-2, 8-1, 8-2, 9-1, 9-2, and/or 10.

At 404 the UE transmits, to the base station, a second message that (i) includes the capability information element and (ii) causes the base station to perform operations that include generating a measurement configuration and determining to handover the user equipment based on the capability information element. For instance, the UE 110 transmits a message, such as that received by a base station at 304 of method 300 and causes the base station to generate the measurement configuration and/or determine to handover the UE 110 at 306 of method 300.

In various implementations, the requested capability IE, such as the capability information element requested in method 300 and/or method 400, explicitly and/or implicitly indicates core networks supported (or unsupported) through the inclusion and/or exclusion of an IE, a field in an IE, or any combination thereof. To demonstrate, consider now FIG. 5 that illustrates an example user equipment New Radio capability (UE-NR-Capability) IE 500 that can be used for communicating inter-radio access technology capabilities of a user equipment in accordance with one or more implementations. In various implementations, a UE generates, stores, and/or communicates the UE-NR-Capability IE 500 to other devices. For instance, UE 110 generates the UE-NR-Capability IE 500 using processor 210 of FIG. 2, stores the UE-NR-Capability IE 500 in CRM 212 of FIG. 2, and/or communicates the UE-NR-Capability IE 500 to the base station 121 over the wireless links 131 of FIG. 1

UE-NR-Capability IE 500 corresponds to an example UE-NR-Capability IE configured by a UE to indicate NR UE Radio Access Capability parameters associated with the UE. In implementations, the UE-NR-Capability IE 500 represents the capability IE requested by the base station at 302 of method 300, and/or the capability IE transmitted by the UE at 404 of method 400. For the sake of clarity, the configuration of information denoted by the UE-NR-Capability IE 500 omits information, and it is to be appreciated that a UE-NR-Capability IE can include any alternate or additional combinations of information not illustrated here.

To indicate the supported and/or included capabilities, the UE (e.g., UE 110) sets various field values within the UE-NR-Capability IE 500. Setting the field values, at times, includes optionally inserting or omitting fields and/or IEs to explicitly and/or implicitly indicate supported/unsupported capabilities of the UE. To demonstrate, consider the optionally included UE-NR-Capability-vxy IE 502 within UE-NR-Capability IE 500. The UE-NR-Capability-vxy IE 502 includes a variety of information as indicated by IE 504, where the IE 504 denotes an example configuration of information included in the UE-NR-Capability-vxy IE 502. For the sake of clarity, the example configuration of information denoted by the IE 504 omits some information, and it is to be appreciated that a UE-NR-Capability-vxy IE can include any additional or alternate combinations of information not illustrated here.

IE 504 optionally includes an instance of an InterRAT-Parameters IE 506, where IE 508 denotes an example configuration of information included in the InterRAT-Parameters 506. In implementations, the inclusion of the (optional) inter-radio access technology parameters (InterRAT-Parameters) IE 506 within the UE-NR-Capability-vxy IE signifies that the corresponding UE supports other RATs. Accordingly, the contents of the InterRAT-Parameters 506 provide additional details on how the UE supports the other RATs. For the sake of clarity, the example configuration of information denoted by the IE 508 omits information, and it is to be appreciated that an InterRAT-Parameters IE can include any additional or alternate combinations of information not illustrated here.

The example configuration of information illustrated by the IE 508 (e.g., InterRAT-Parameters 506) optionally includes an instance of an IRAT-ParametersEUTRA IE 510. IE 512 denotes an example configuration of information included in an IRAT-ParametersEUTRA IE. For the sake of clarity, the IE 512 omits information, and it is to be appreciated that an IRAT-ParametersEUTRA IE can include any combination of information. In implementations, the inclusion of the IRAT-ParametersEUTRA IE within the Inter-RAT-Parameters IE implies support of at least one core network, such as 5GC or EPC.

Figure 5:
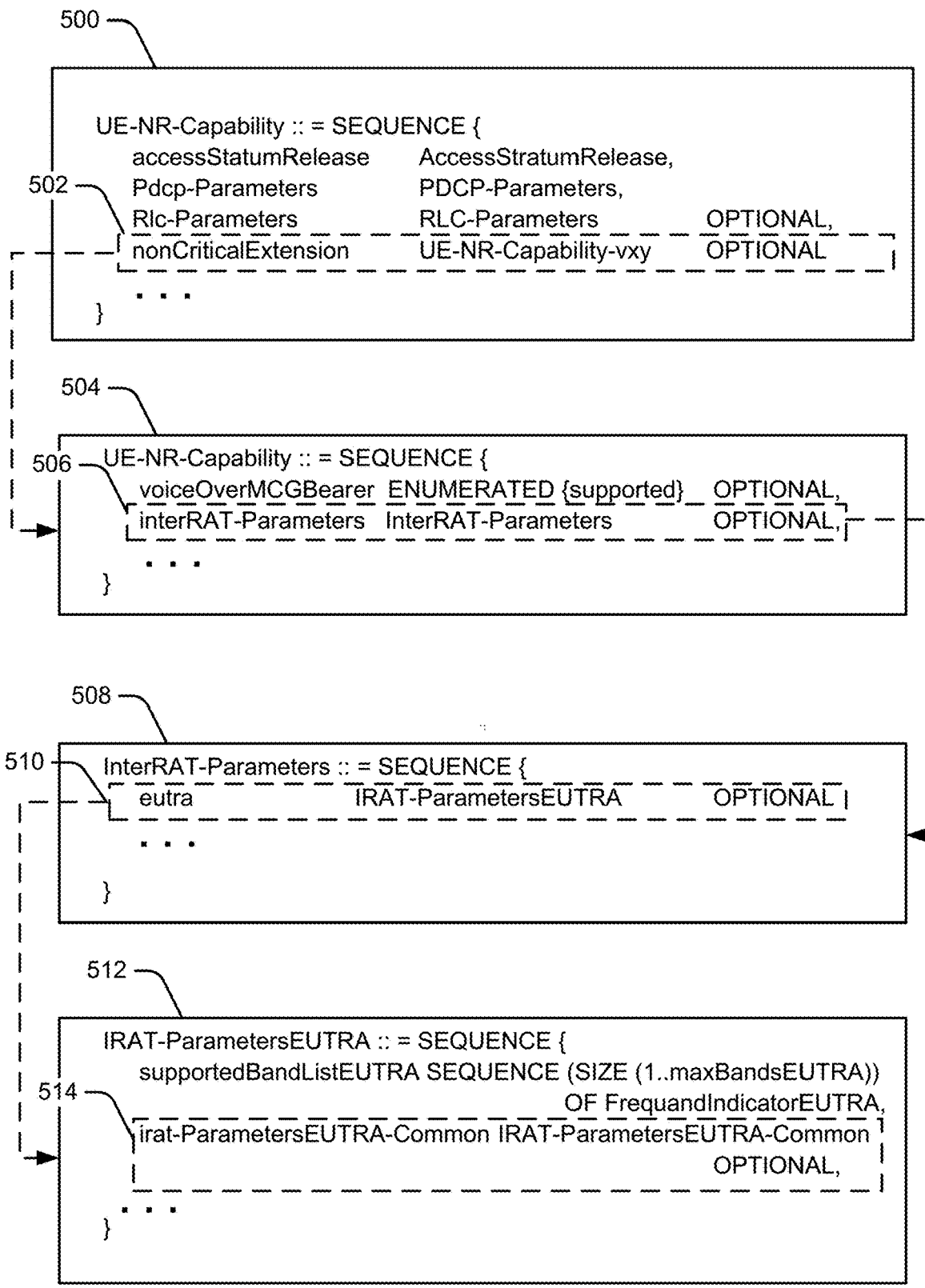
FIG. 5 illustrates an example information element that can be used for communicating inter-radio access technology capabilities of a user equipment in accordance with one or more implementations.

In some implementations, the IRAT-ParamtersEUTRA IE includes one or more fields that indicate radio capability(ies). For example, as illustrated in FIG. 5, the IE 512 includes a supportedBandListEUTRA field that provides an indication of supported frequency bands but alternate or additional fields can be included to indicate radio capability(ies).

As one example, in a first implementation, the inclusion of the optional IRAT-ParametersEUTRA IE within an Inter-RAT-Parameters IE implicitly indicates that the corresponding UE supports an EPC, such as the EPC network 162 of FIG. 1. Thus, in the first implementation, a complementary base station receiving the UE-NR-Capability IE with the included (optional) IRAT-ParametersEUTRA IE determines that the corresponding UE supports the EPC.

As another example, in a second implementation, the inclusion of the (optional) IRAT-ParametersEUTRA IE 508 within an InterRAT-Parameters IE 506 implicitly indicates that the corresponding UE supports 5GC. Thus, in the second implementation, a complementary base station receiving the UE-NR-Capability IE with the included (optional) InterRATParametersEUTRA 510 determines that the corresponding UE supports 5GC. Thus, the inclusion of the (optional) IRAT-ParametersEUTRA IE within an InterRAT-Parameters IE implies, at times, a supported core network (e.g., either EPC or 5GC).

At times, various UEs support multiple core networks, such as both 5GC and EPC. Some implementations of an IRAT-ParametersEUTRA IE provide optional fields that allow a UE configuring the IRAT-ParametersEUTRA IE to explicitly or implicitly indicate support (or lack of support) for additional core networks. Alternately or additionally, an IRAT-ParametersEUTRA IE includes a configurable IE, such as IRAT-ParametersEUTRA-Common IE 514, that provides optional fields used by a UE to explicitly or implicitly indicate support (or lack of support) for additional core networks.

An explicit indication corresponds to a field or IE that has a primary and/or dedicated purpose for providing a specific indication. For example, a field that has a primary purpose of indicating support for a core network, such as an optional 5GC field used to indicate support for 5GC or an optional EPC field used to indicate support for EPC, are examples of explicit indications. An implicit indication corresponds to using the presence (or lack of presence) a field or IE as an indication of information, where the field or IE has a different primary purpose than indicating the information. To illustrate, consider an IE that includes fields dedicated to providing frequency band information, but lacks any fields with a primary purpose of indicating a supported (or unsupported) core network. An implicit indication in this example corresponds to including or excluding the IE within a message, where the primary purpose of the IE corresponds to providing the frequency band information, and the presence (or lack of presence) of the IE provides secondary, and implicit, information about supported core networks. Alternately or additionally, an implicit indication corresponds to excluding a field, such as excluding a field with a primary purpose (e.g., excluding a 5GC field to implicitly indicate no support for 5GC versus including a No5GC field that explicitly indicates no support for 5GC).

Figures 1, 6:
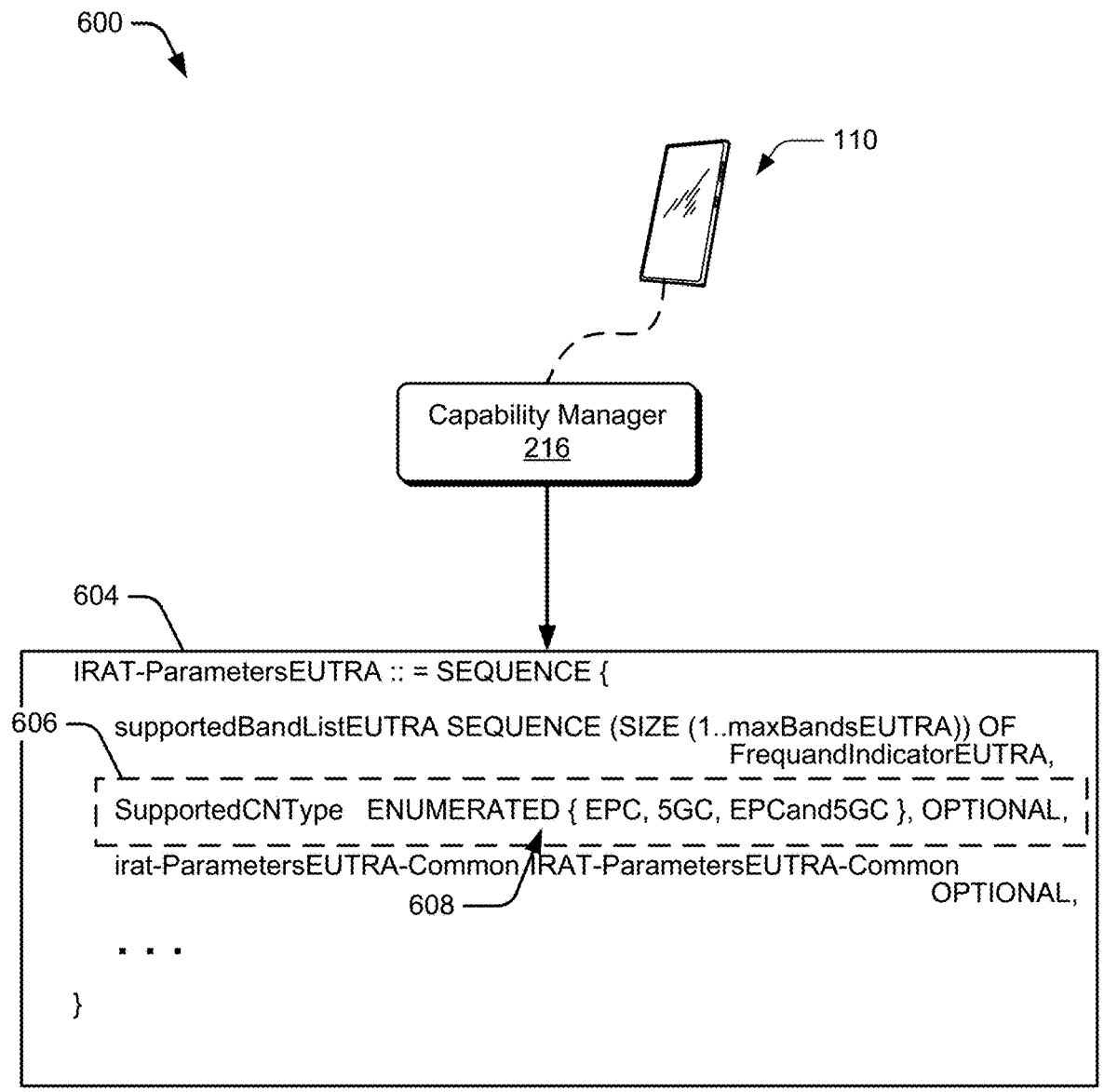
Figures 2, 6:
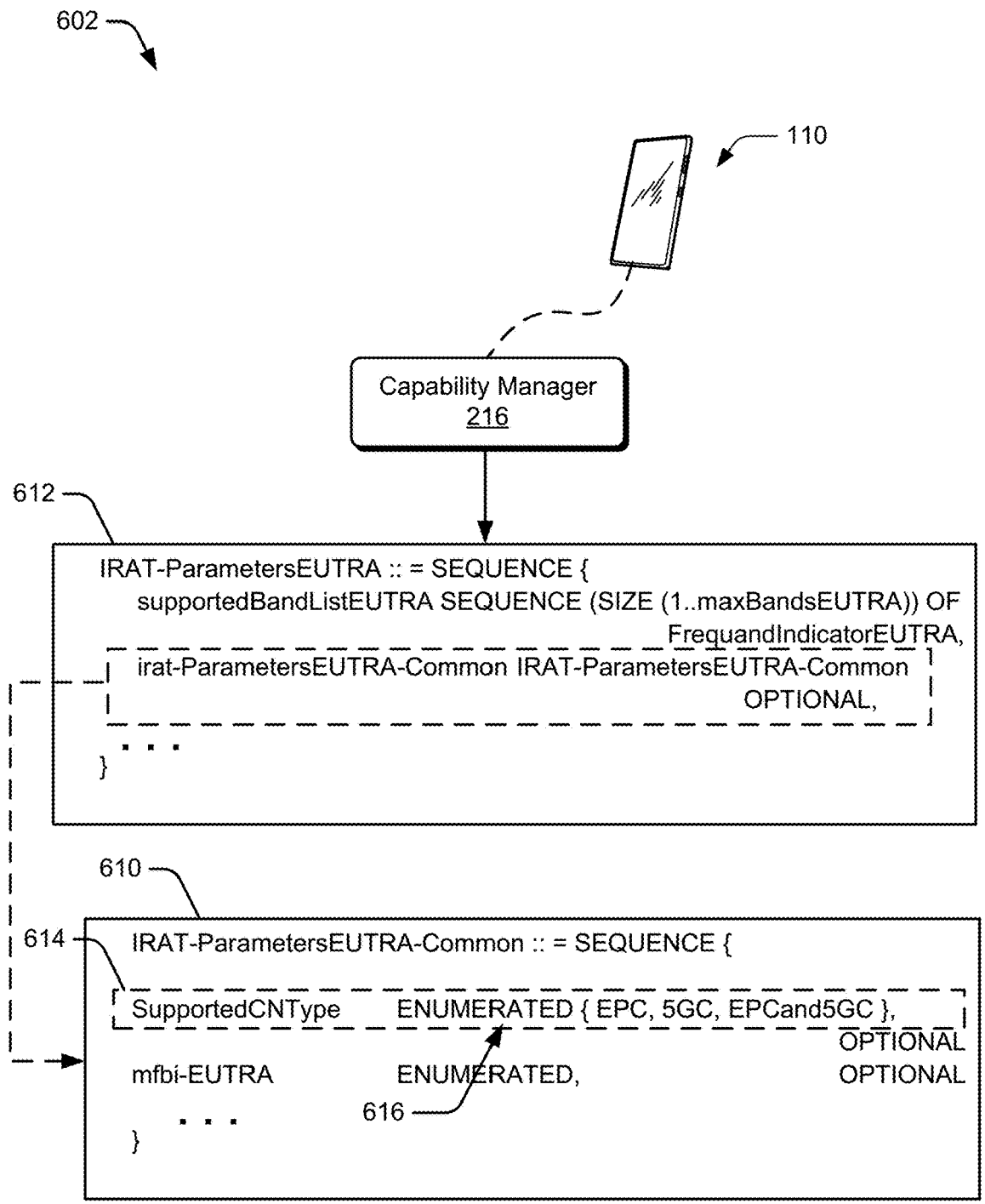

To demonstrate, consider now FIGS. 6-1 and 6-2 that illustrate a first example 600 and a second example 602, respectively, of configurable IEs used by a UE to provide an indication of supported/unsupported core network types. In these examples, a UE (e.g., UE 110) explicitly indicates the supported core network type(s). The first example 600 includes an IRAT-ParametersEUTRA IE 604 that corresponds to an IE included in a UE-NR-Capability IE, such as the IRAT-ParametersEUTRA IE 510 included in the UE-NR-Capability IE 500 of FIG. 5. The configuration of the IRAT-ParametersEUTRA IE 604 includes a field, SupportedCNType 606, that a UE configures to indicate the supported core network types. In implementations, the SupportedCNType 606 corresponds to an enumerated type 608 that includes at least three data types: "EPC", "5GC", and "EPCand5GC". Accordingly, to explicitly indicate support for only 5GC, the UE sets the SupportedCNType 606 field to "5GC". Similarly, to explicitly indicate support for only EPC, a UE sets the SupportedCNType field to "EPC". In scenarios where the UE supports both 5GC and EPC, the UE sets the SupportedCNType field to "EPCand5GC". Thus, by including and setting the SupportedCNType field in an IRAT-ParametersEUTRA IE of a UE-NR-Capabilities IE, a UE provides an explicit indication of supported core network types. In some implementations, the capability manager 216 of UE 110 configures the SupportedCNType 606 in response to receiving a request for a capability information element, such as that described at 402 and/or at 404 of method 400.

In the second example 602 of FIG. 6-2, an optionally included IRAT-ParametersEUTRA-Common IE 610 of an IRAT-ParametersEUTRA IE 612 includes an optional field: SupportedCNType 614. Similar to the SupportedCNType 606 of FIG. 6-1, the SupportedCNType 614 corresponds to an enumerated type 616 with at least three data types (e.g., "EPC", "5GC", "EPCand5GC"). In implementations, a UE explicitly indicates supported core network types by setting the SupportedCNType 614 (of an IRAT-ParametersEUTRA-Common IE) to one of the corresponding enumerated types. In some implementations, the capability manager 216 of UE 110 configures the SupportedCNType 614 in response to receiving a request for a capability information element, such as that described at 402 and/or at 404 of method 400.

Figures 1, 7:
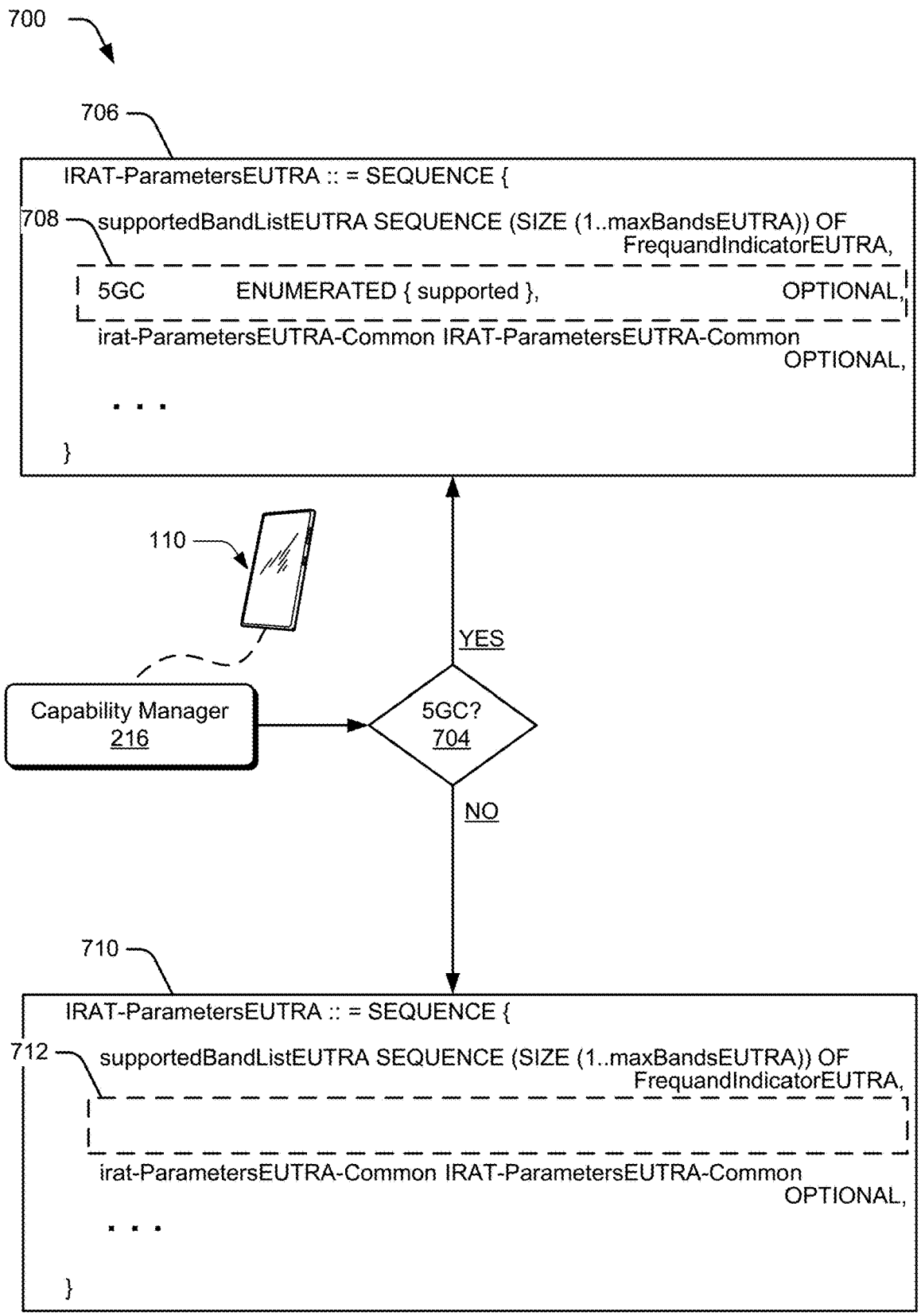
Figures 2, 7:
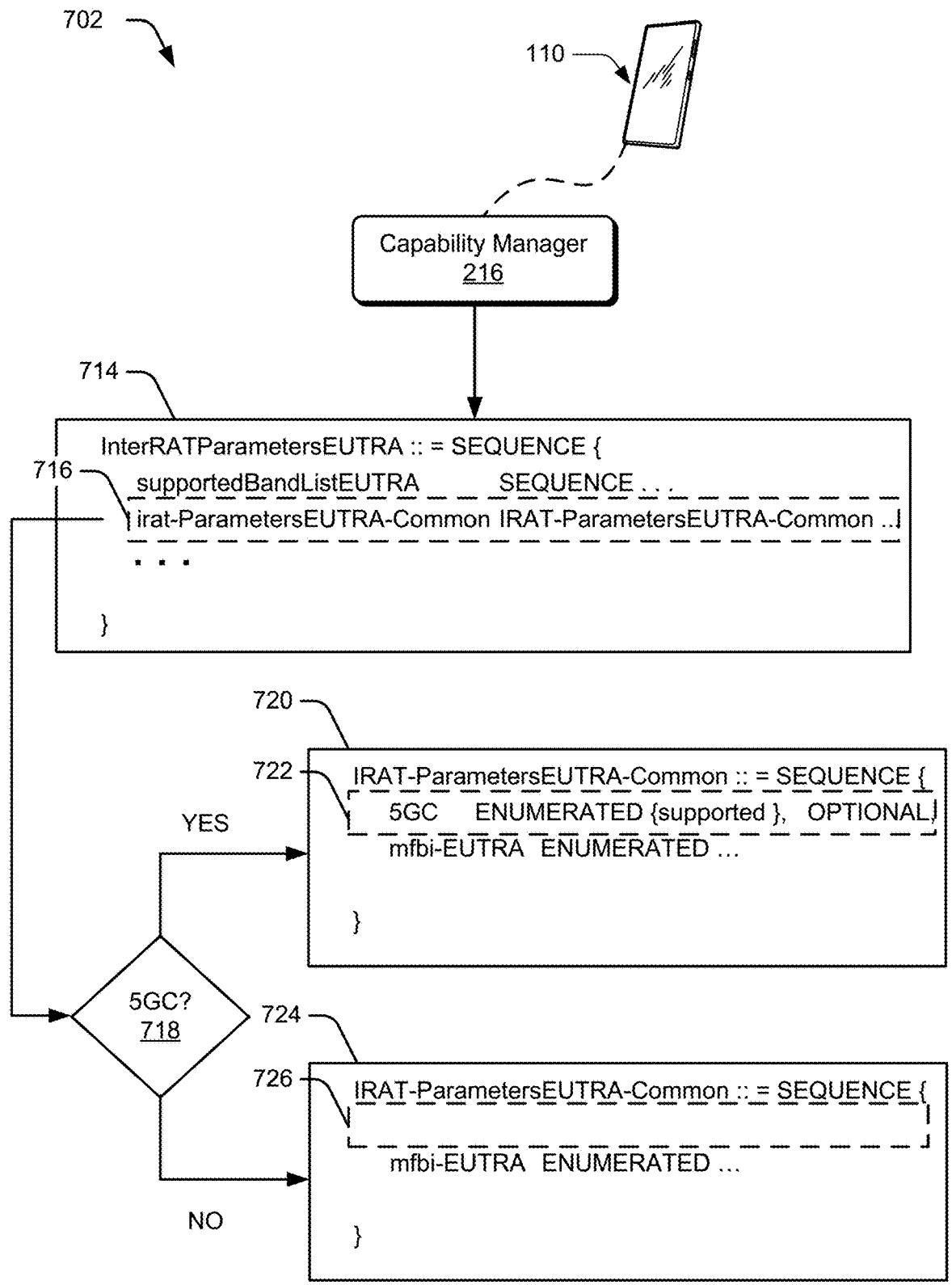

Now consider FIGS. 7-1 and 7-2 that illustrate a third example 700 and a fourth example 702 of configurable IEs used by a UE to explicitly or implicitly provide an indication of supported/unsupported core network types. In the third example 700, a UE 110 determines (by way of the capability manager 216) to include an (optional) IRAT-ParametersEUTRA IE in an InterRAT-Parameters IE, such as the IRAT-ParametersEUTRA IE 510 included in the InterRAT-Parameters IE 506 as described with reference to FIG. 5. In some implementations, the inclusion of the IRAT-ParametersEUTRA IE implicitly indicates that the corresponding UE supports EPC.

Next, at 704, the capability manager 216 determines whether the UE 110 additionally supports a 5GC, such as the 5GC network 150. In response to determining that the UE 110 supports the 5GC, the capability manager 216 configures an IRAT-ParametersEUTRA IE 706 to include the optional 5GC field 708. Conversely, in response to determining that the UE 110 does not support the 5GC, the capability manager 216 configures an IRAT-ParametersEUTRA 710 to exclude the optional 5GC field, denoted in the third example with empty space 712 for emphasis. Thus, in the third example 700, the capability manager 216 implicitly indicates support of EPC by including an (optional) IRAT-ParametersEUTRA IE in an InterRAT-Parameters IE, explicitly indicates support of the 5GC by including the optional 5GC field 708 in the IRAT-ParametersEUTRA IE, and implicitly indicates no support of the 5GC by excluding the optional 5GC field from the IRAT-ParametersEUTRA IE.

In the fourth example 702, and similar to the third example 700, the capability manager 216 of the UE 110 determines to optionally include an IRAT-ParametersEUTRA IE 714 in an InterRAT-Parameters IE, thus implicitly indicating that the corresponding UE supports the EPC. However, to explicitly or implicitly indicate the UE 110's support (or lack of support) for 5GC, the capability manager 216 modifies an IRAT-ParametersEUTRA-Common IE 716 of the IRAT-ParametersEUTRA IE 714.

To illustrate, at 718, the capability manager 216 determines whether the UE 110 additionally supports the 5GC. In response to determining the UE 110 supports 5GC, the capability manager 216 generates IRAT-ParametersEUTRA-Common IE 720 to use as the IRAT-ParametersEUTRA-Common IE 716. The IRAT-ParametersEUTRA-Common IE 720 includes optional 5GC field 722, thus explicitly indicating support for 5GC. Conversely, in response to determining the UE 110 does not support the 5GC, the capability manager 615 generates IRAT-ParametersEUTRA-Common IE 724 to use as the IRAT-ParametersEUTRA-Common IE 716, where the IRAT-ParametersEUTRA-Common IE 724 excludes the optional 5GC field, emphasized with empty space 726. In other words, the IRAT-ParametersEUTRA-Common IE 724 implicitly indicates no support for the 5GC by excluding the optional 5GC field. Thus, in the fourth example 702, the capability manager 216 implicitly indicates support of the EPC by including an IRAT-ParametersEUTRA IE in an InterRAT-Parameters IE, explicitly indicates support of the 5GC by including the optional 5GC field 722 in the IRAT-ParametersEUTRA-Common IE, and implicitly indicates no support of the 5GC by excluding the optional 5GC field from the IRAT-ParametersEUTRA-Common IE.

Figures 1, 8:
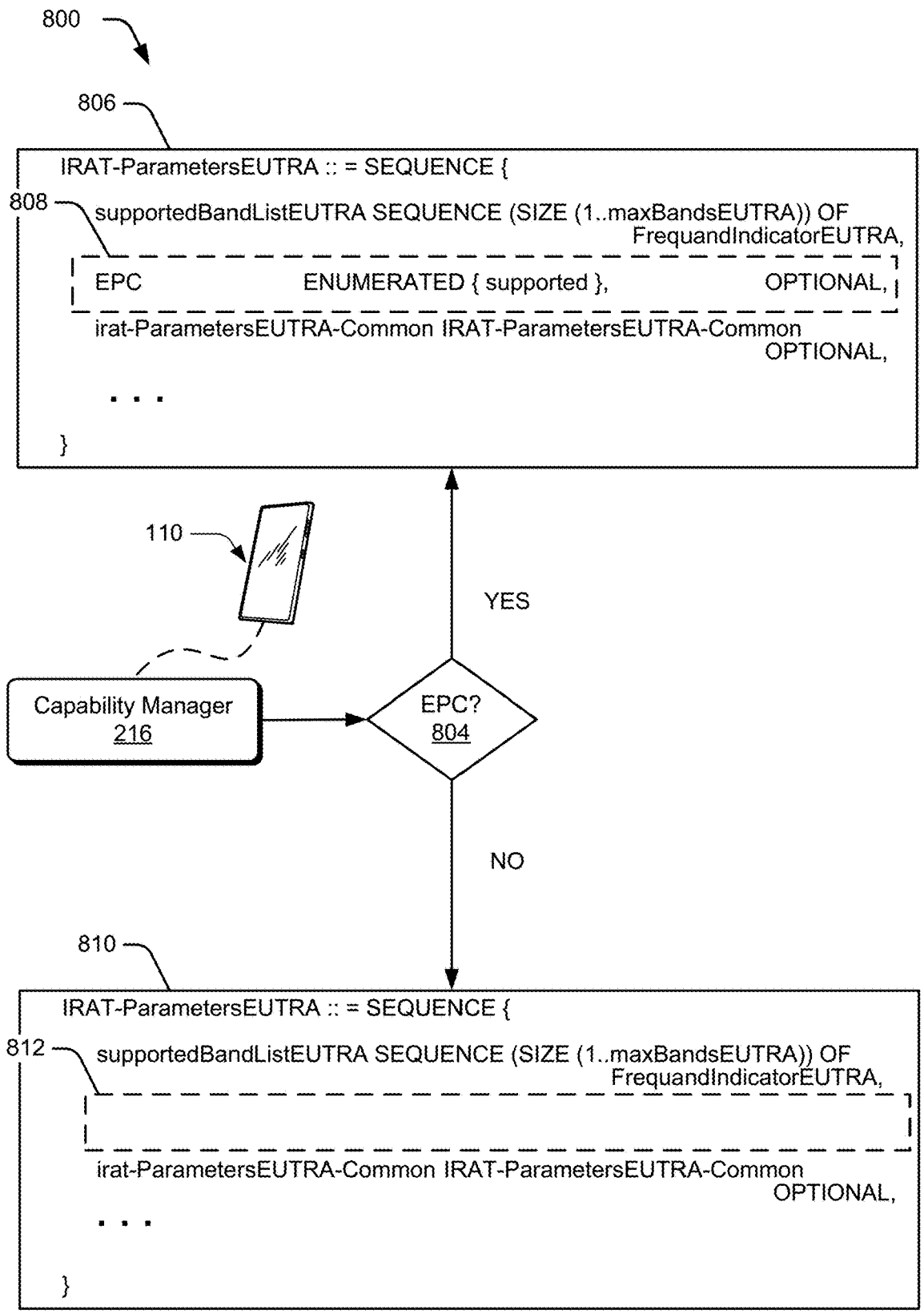
Figures 2, 8:
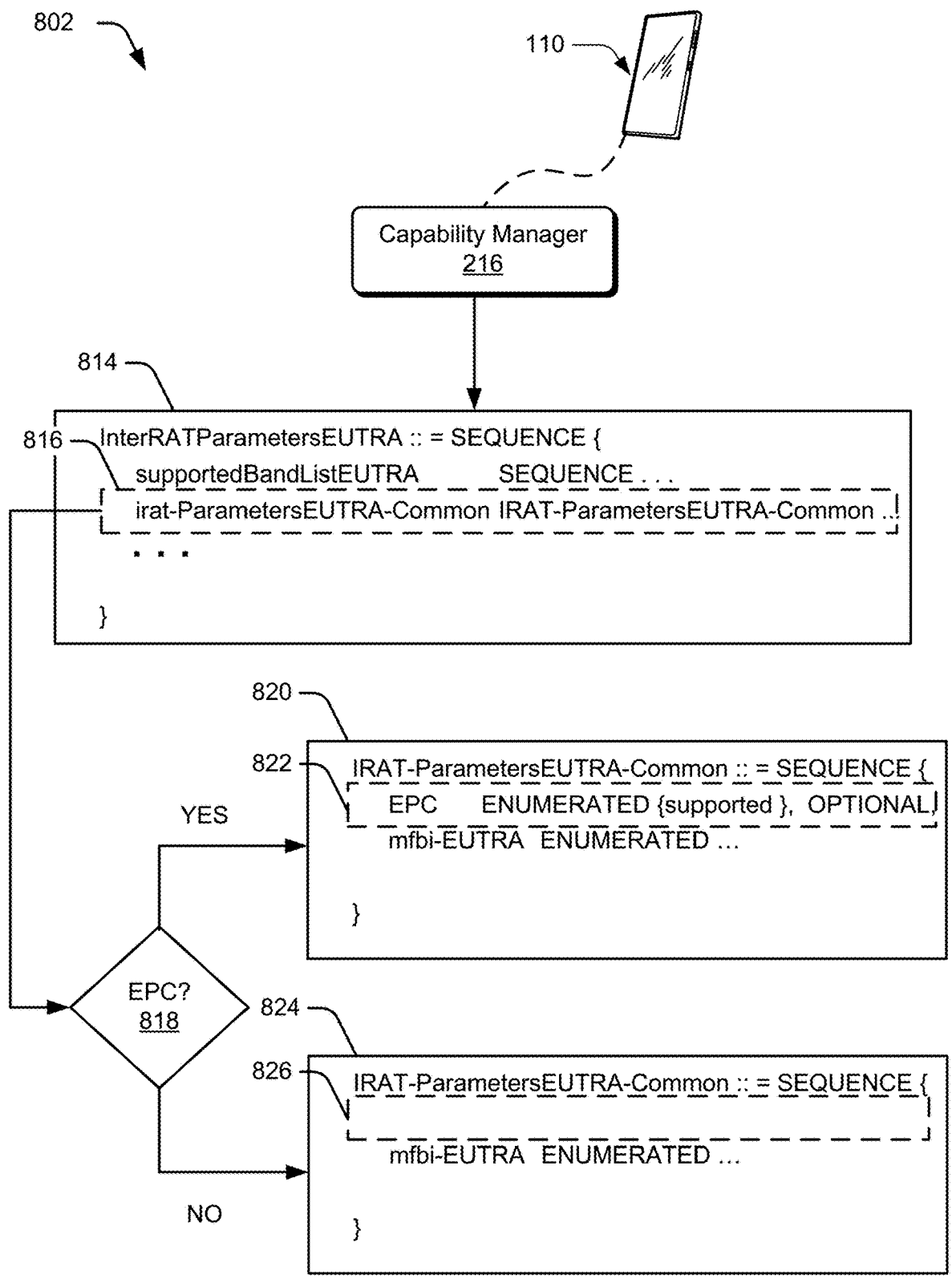

Now consider FIGS. 8-1 and 8-2 that illustrate a fifth example 800 and a sixth example 802 of configurable IEs used by a UE to explicitly or implicitly provide an indication of supported/unsupported core network types. In the fifth example 800, a UE 110 determines (by way of the capability manager 216) to include an (optional) IRAT-ParametersEUTRA IE in an InterRAT-Parameters IE, such as the IRAT-ParametersEUTRA IE 510 included in the InterRAT-Parameters IE 506 as described with reference to FIG. 5. In some implementations, the inclusion of the (optional) IRAT-ParametersEUTRA IE implicitly indicates that the corresponding UE supports 5GC.

Next, at 804, the capability manager 216 determines whether the UE 110 additionally supports an EPC, such as the EPC network 162 of FIG. 1. In response to determining that the UE 110 supports the EPC, the capability manager 216 configures an IRAT-ParametersEUTRA IE 806 to include the optional EPC field 808. Conversely, in response to determining that the UE 110 does not support the EPC, the capability manager 216 configures an IRAT-ParametersEUTRA 810 to exclude the optional EPC field, denoted with empty space 812 for emphasis. Thus, in the fifth example 800, the capability manager 216 implicitly indicates support of the 5GC by including an IRAT-ParametersEUTRA IE in an InterRAT-Parameters IE, explicitly indicates support of the EPC by including the optional EPC field 808 in the IRAT-ParametersEUTRA IE, and implicitly indicates no support of the EPC by excluding the optional EPC field from the IRAT-ParametersEUTRA IE.

In the sixth example 802, and similar to the fifth example 800, the capability manager 216 of the UE 110 determines to include an (optional) IRAT-ParametersEUTRA IE 814 in an InterRAT-Parameters IE, thus implicitly indicating that the corresponding UE supports the 5GC. However, to explicitly or implicitly indicate the UE 110's support (or lack of support) for the EPC, the capability manager 216 modifies an IRAT-ParametersEUTRA-Common IE 816 of the IRAT-ParametersEUTRA IE 814.

To illustrate, at 818, the capability manager 216 determines whether the UE 110 additionally supports the EPC. In response to determining the UE 110 supports the EPC, the capability manager 216 generates IRAT-ParametersEUTRA-Common IE 820 to use as the IRAT-ParametersEUTRA-Common IE 816. The IRAT-ParametersEUTRA-Common IE 820 includes optional EPC field 822, thus explicitly indicating support for EPC. Conversely, in response to determining the UE 110 does not support EPC, the capability manager 216 generates IRAT-ParametersEUTRA-Common IE 824 to use as the IRAT-ParametersEUTRA-Common IE 816, where the IRAT-ParametersEUTRA-Common IE 824 excludes the optional EPC field, emphasized here with empty space 826. In other words, the IRAT-ParametersEUTRA-Common IE 824 implicitly indicates no support for EPC by excluding the optional EPC field. Thus, in the sixth example 802, the capability manager 216 implicitly indicates support of 5GC by including an IRAT-ParametersEUTRA IE in an InterRAT-Parameters IE, explicitly indicates support of EPC by including the optional EPC field 822 in the an IRAT-ParametersEUTRA-Common IE, and implicitly indicates no support of EPC by excluding the optional EPC field from the IRAT-ParametersEUTRA-Common IE.

Figures 1, 9:
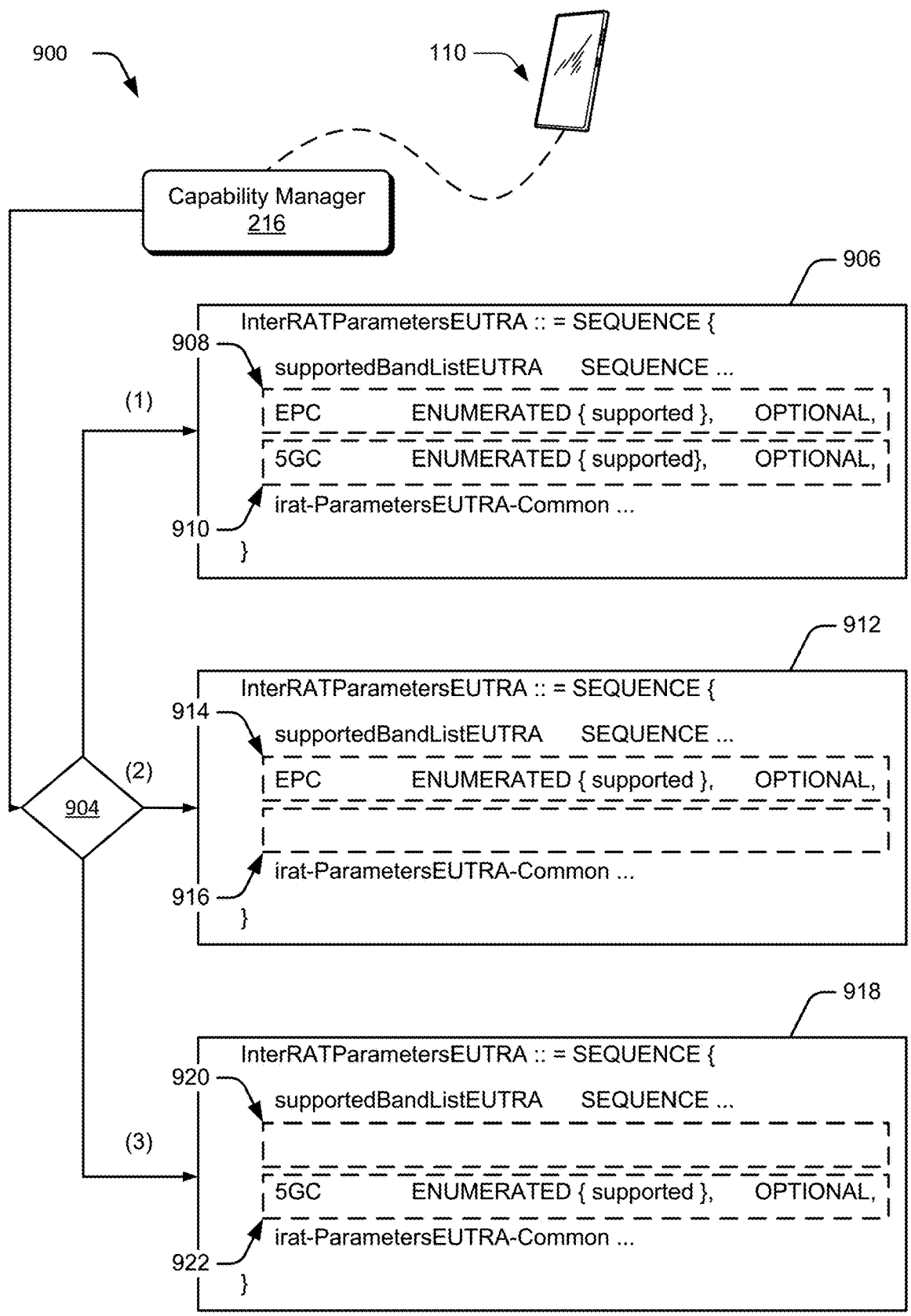
Figures 2, 9:
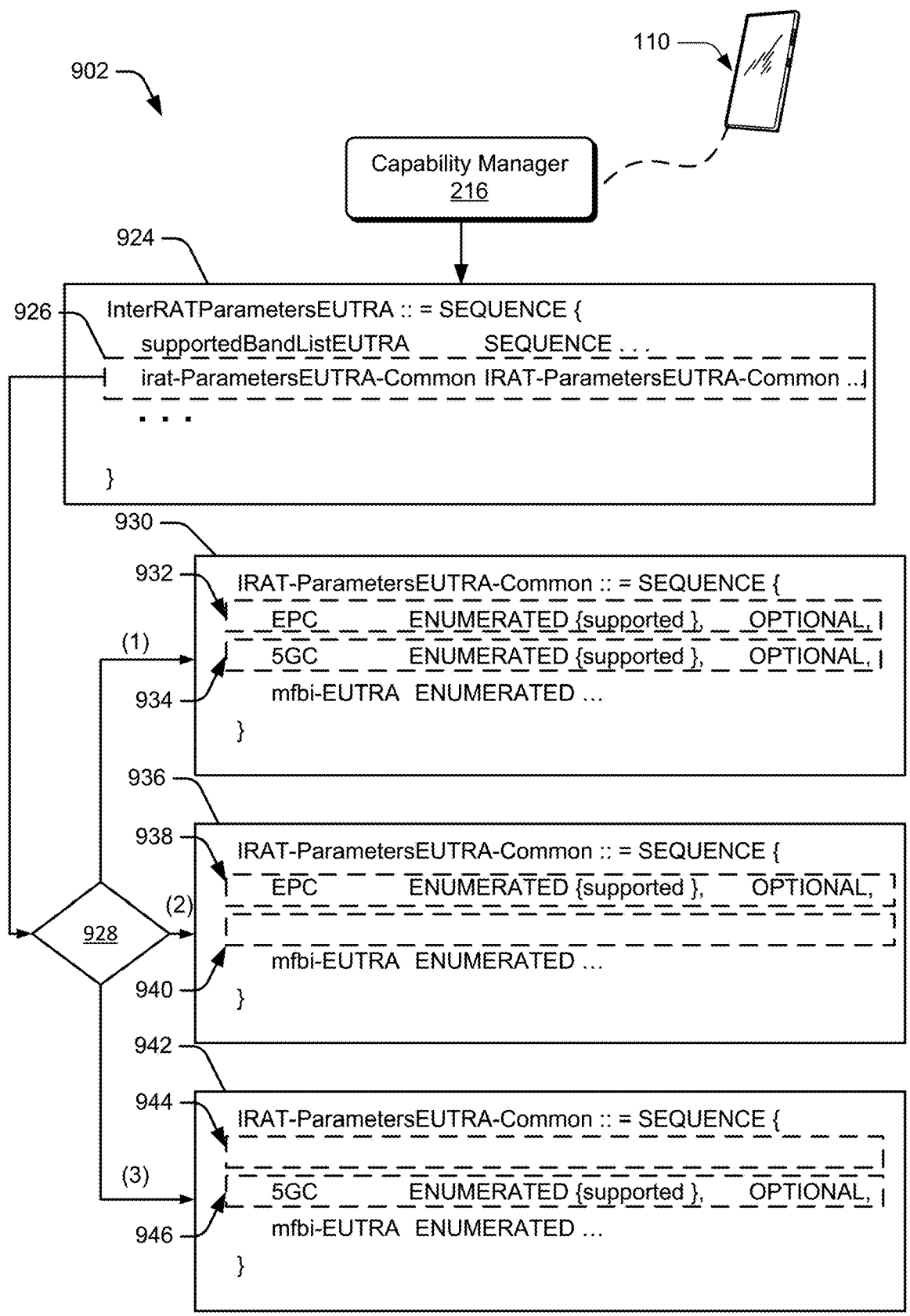

Now consider FIGS. 9-1 and 9-2 that illustrate a seventh example 900 and an eighth example 902 of configurable IEs used by a UE to explicitly or implicitly provide an indication of supported/unsupported core network types. In the seventh example 900, a UE 110 determines (by way of the capability manager 216) to include an (optional) IRAT-ParametersEUTRA IE in an InterRAT-Parameters IE, such as the IRAT-ParametersEUTRA IE 510 included in the InterRAT-Parameters IE 506 as described with reference to FIG. 5.

In the seventh example 900, the capability manager 216 determines, at 904, to explicitly indicate the core networks supported by the UE 110. For example, following path (1), in response to determining the UE supports both EPC and 5GC, the capability manager configures IRAT-ParametersEUTRA IE 906 to include optional EPC field 908 and optional 5GC field 910. Thus, by including the EPC field 908 and the 5GC field 910, the capability manager configures the IRAT-ParametersEUTRA IE 906 to explicitly indicate support for EPC and explicitly indicate support for 5GC.

Following path (2), in response to determining the UE supports EPC and does not support 5GC, the capability manager configures the IRAT-ParametersEUTRA IE 912 to include optional EPC field 914 and exclude optional 5GC field, emphasized by empty space 916. Thus, by including the optional EPC field 908 and excluding the optional 5GC field, the capability manager configures the IRAT-ParametersEUTRA IE 912 to explicitly indicate support for EPC and implicitly indicate no support for 5GC.

Following path (3), in response to determining the UE supports 5GC and does not support EPC, the capability manager configures the IRAT-ParametersEUTRA IE 918 to exclude the optional EPC field, emphasized here by empty space 920, and include the optional 5GC field 922. By excluding the optional EPC field, and including the 5GC field 922, the capability manager configures the IRAT-ParametersEUTRA IE 918 to implicitly indicate no support for EPC and explicitly indicate support for 5GC. Thus, in the seventh example 900, the capability manager 216 can indicate any combination of support for 5GC and EPC by including and/or excluding optional EPC and 5GC fields.

In the eighth example 902, and similar to the seventh example 900, the capability manager 216 of the UE 110 determines to include an (optional) IRAT-ParametersEUTRA IE 924 in an InterRAT-Parameters IE, such as the IRAT-ParametersEUTRA IE 510 included in the InterRAT-Parameters IE 506 as described with reference to FIG. 5. To explicitly or implicitly indicate the UE 110's support (or lack of support) for EPC and 5GC, the capability manager 216 modifies an IRAT-ParametersEUTRA-Common IE 926 of the IRAT-ParametersEUTRA IE 924.

To illustrate, at 928, the capability manager 216 determines whether the UE 110 supports EPC, 5GC, or both. For example, following path (1), in response to determining the UE supports both EPC and 5GC, the capability manager configures the IRAT-ParametersEUTRA-Common IE 930 to include optional EPC field 932 and optional 5GC field 934. By including the optional EPC field 932 and the optional 5GC field 934, the capability manager configures the IRAT-ParametersEUTRA-Common IE 930 to explicitly indicate support for EPC and explicitly indicate support for 5GC.

Following path (2), in response to determining the UE supports EPC and does not support 5GC, the capability manager configures the IRAT-ParametersEUTRA-Common IE 936 to include optional EPC field 938 and exclude the optional 5GC field, emphasized by empty space 940. By including the EPC field 938 and excluding the optional 5GC field, the capability manager configures the IRAT-ParametersEUTRA-Common IE 936 to explicitly indicate support for EPC and implicitly indicate no support for 5GC.

Following path (3), in response to determining the UE supports 5GC and does not support EPC, the capability manager configures the IRAT-ParametersEUTRA-Common IE 942 to exclude the optional EPC field, emphasized here by empty space 944, and include optional 5GC field 946. By excluding the optional EPC field, and including the 5GC field 946, the capability manager configures the IRAT-ParametersEUTRA IE 942 to implicitly indicate no support for EPC and explicitly indicate support for 5GC. Thus, in the eighth example 902, the capability manager 216 can indicate any combination of support for 5GC and EPC by including and/or excluding optional EPC and 5GC fields.

Figures 1, 10:
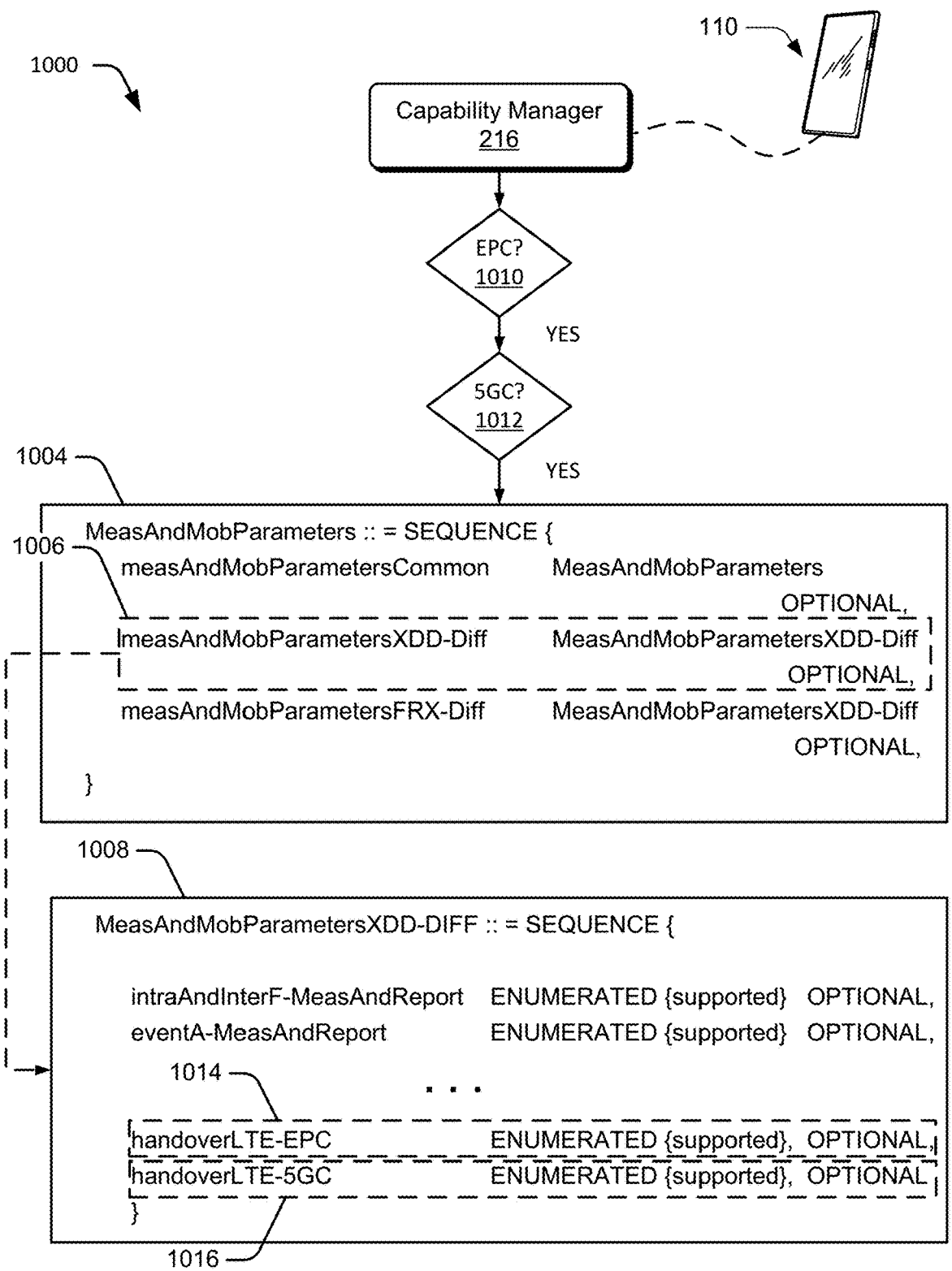
Figures 2, 10:
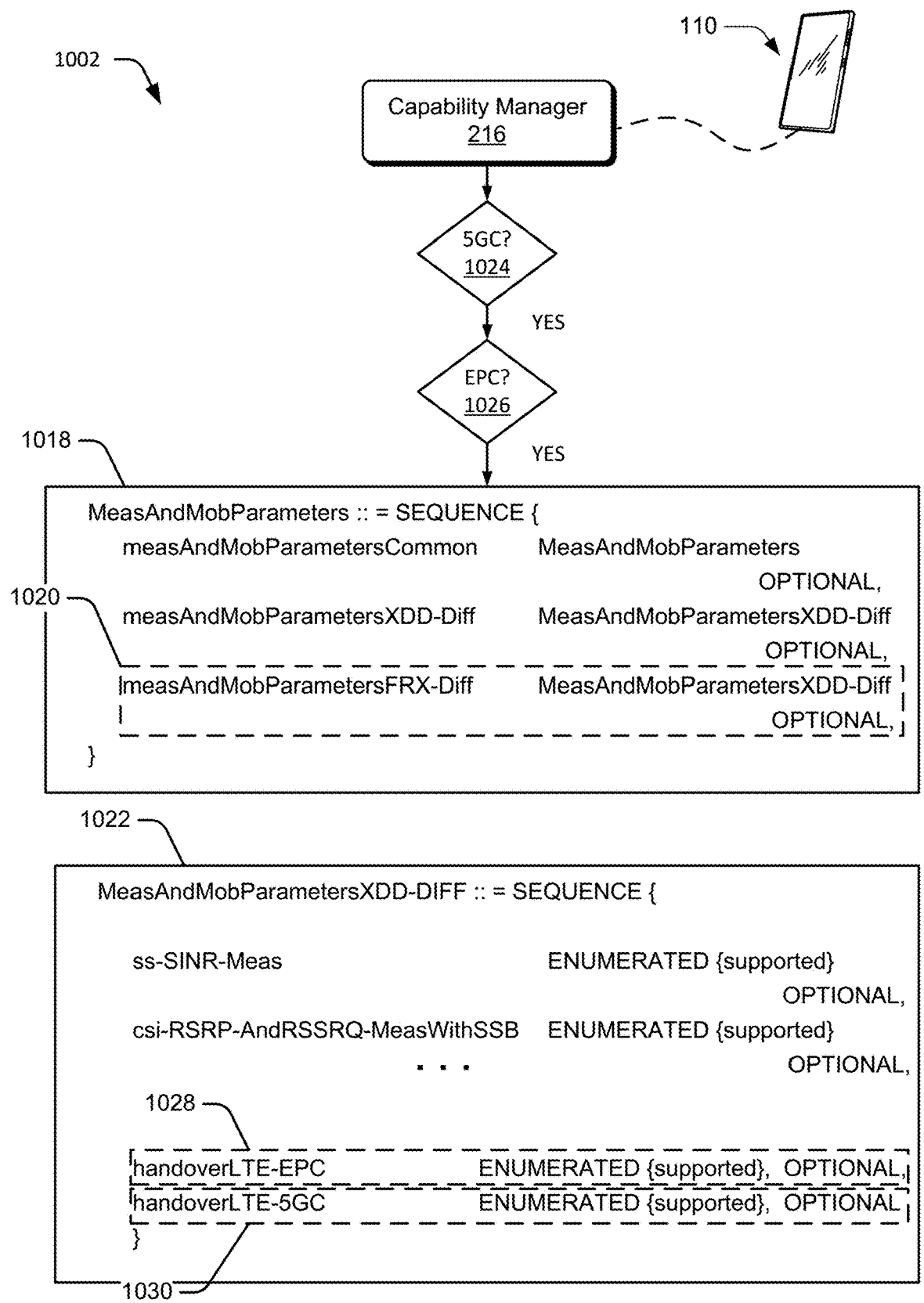

As yet another example, consider now FIGS. 10-1 and 10-2, which illustrate a ninth example 1000 and a tenth example 1002 of configurable IEs used by a UE to explicitly or implicitly provide an indication of supported/unsupported core network types. In the ninth example 1000 and the tenth example 1002, a UE 110 determines (by way of the capability manager 216) whether to include optional field(s) in information element(s) to explicitly indicate support of a core network, and/or whether to exclude optional field(s) in the information element to implicitly indicate no support of a core network, similar to the optional fields described with reference to FIGS. 9-1 and 9-2 (e.g., optional fields 908, 910, 932, 934).

In FIG. 10-1, the capability manager 216 determines a configuration for a MeasAndMobParameters IE 1004 to indicate the capabilities of UE 110. In some implementations, the UE 110 returns the MeasAndMobParameters IE 1004 in response to receiving a request for a capability information element, such as by including the MeasAndMobParameters IE 1004 within a UE-NR-Capabilities IE and/or as a stand-alone IE. For example, in response to receiving the first message from the base station as described at 402 of method the 400, the UE 110 configures and returns the MeasAndMobParameters IE 1004 to the base station as described at 404 of the method 400. Accordingly, the capability manager 216, at times, returns UE capability information using the MeasAndMobParameters IE 1004.

In the ninth example 1000, the MeasAndMobParameters IE 1004 includes an optional measAndMobParametersXDD-Diff IE 1006. The measAndMobParametersXDD-Diff IE 1006 includes a variety of information as indicated by IE 1008, where the IE 1008 denotes an example configuration of information included in the measAndMobParametersXDD-Diff IE 1006. For the sake of clarity, the example configuration of information denoted by the IE 1008 omits some information, and it is to be appreciated that a measAndMobParametersXDD-Diff IE 1006 can include any additional or alternate combinations of information not illustrated here.

In implementations, the capability manager 216 determines at 1010 and at 1012 whether the UE 110 supports an EPC and/or an 5GC (e.g., similar to that described at 904 of FIG. 9-1, and at 928 of FIG. 9-2). In this example, the capability manager 216 determines that the UE 110 supports both the EPC and the 5GC, and includes an optional handoverLTE-EPC field 1014 (e.g., similar to optional EPC field 908, optional EPC field 932) to explicitly indicate support of the EPC, and includes an optional handoverLTE-5GC field 1016 to explicitly indicate support of the 5GC. While not illustrated in FIG. 10-1, the capability manager 216 can alternately or additionally determine to exclude the optional handoverLTE-EPC field 1014 and/or the optional handover LTE-5GC field 1016, such as that illustrated by IE 912, IE 918, IE 936, and/or IE 942 of FIGS. 9-1 and 9-1, to implicitly indicate no support for the core network of the respective optional field not included in measAndMobParametersXDD-DIFF IE 1006.

In the tenth example 1002, the MeasAndMobParameters IE 1018 includes an optional measAndMobParametersFRX-Diff IE 1020. The measAndMobParametersFRX-Diff IE 1020 includes a variety of information as indicated by the example information denoted with IE 1022. For the sake of clarity, the example of information denoted by the IE 1022 omits some information, and it is to be appreciated that the measAndMobParametersFRX-Diff IE 1020 can include additional or alternate combinations of information not illustrated here.

The capability manager 216 determines at 1024 and at 1026 whether the UE 110 supports an EPC and/or an 5GC (e.g., similar to that described at 904 of FIG. 9-1, at 928 of FIG. 9-2). In this example, the UE 110 determines that the UE 110 supports both the EPC and the 5GC. Accordingly, the capability manager 216 includes an optional handoverLTE-EPC field 1028 (e.g., similar to optional EPC field 908, optional EPC field 932) to explicitly indicate support of the EPC and includes an optional handoverLTE-5GC field 1030 to explicitly indicate support of the 5GC. While not illustrated in FIG. 10-2, the capability manager 216 can alternately or additionally determine to exclude the optional handoverLTE-EPC field 1028 and/or the optional handover LTE-5GC field 1030, such as that illustrated by IE 912, IE 918, IE 936, and/or IE 942 of FIGS. 9-1 and 9-2, to implicitly indicate no support for the core network of the respective optional field not included in the measAndMobParametersFRX-DIFF IE 1020. Further, while example 1000 and example 1002 are illustrated separately, various implementations can include and/or exclude optional fields in any combination of the measAndMobParametersXDD-Diff IE 1006 and/or the measAndMobParametersFRX-Diff IE 1020 within a MeasAndMobParameters IE.

Having described examples of managing inter-radio access technology capabilities of a user equipment using configurable IEs, consider now some example signal and control transaction diagrams that are in accordance with one or more implementations.

Signal and Control Transaction Diagrams

Figure 11:
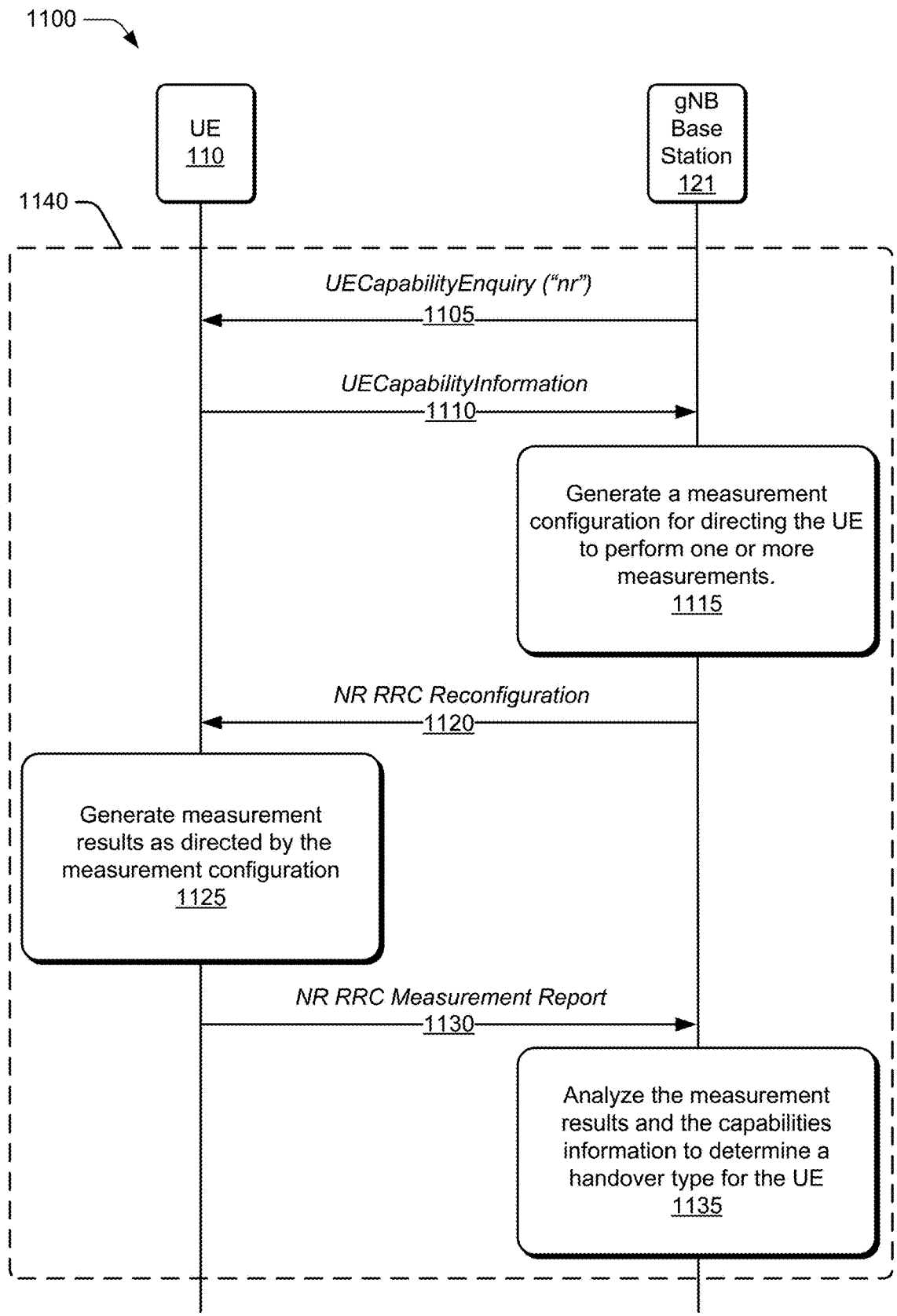
FIG. 11 illustrates an example signal and control transaction diagram associated with managing inter-radio access technology capabilities of a user equipment in accordance with one or more implementations.

FIG. 11 illustrates an example signal and control transaction diagram 1100 associated with managing inter-radio access technology capabilities of a user equipment in accordance with one or more implementations. The diagram 1100 illustrates example exchanges between the user equipment 110 and the gNB base station 121 of FIG. 1, where the gNB base station 121 requests user equipment capability information, such as that described by method 300, and the UE 110 returns user equipment capability information, such as that described by method 400. Alternately or additionally, the UE 110 generates measurement report(s) according to a generated measurement configuration from the base station 121. Accordingly, in implementations, the signal and control transaction diagram 1100 works in conjunction with, wholly or in part, with methods 300 or 400 and/or the various IE configurations described with reference to FIGS. 5 to 10.

At 1105, the gNB base station 121 sends a UECapabilityEnquiry to the UE 110, such as that described at 402 of method 400. For example, the gNB base station transmits the UECapabilityEnquiry over the wireless links 131. In some implementations, the base station 121 requests the UE-NR-Capabilities of the UE 110, such as by sending a New Radio (NR) Radio Resource Control (RRC) that includes an Information Element (IE) Radio Access Technology (RAT) type set to "nr". This directs the UE 110 to return the UE-NR-Capabilities in a reply.

At 1110, the UE 110 returns the UECapabilityInformation to the gNB base station 121, such as that described at 304 of method 300. At times, the UECapabilityInformation returned by the UE 110 includes a UE-NR-Capability IE with any combination of NR information such as, by way of example and not of limitation, NR capabilities, supported EUTRA band information, an indication of whether EPC is supported, an indication of whether 5GC is supported, etc.

For example, some implementations of the UE 110 indicate support of EPC or 5GC by including an optional IRAT-ParametersEUTRA IE in an InterRAT-ParametersIE (e.g., IRAT-ParametersEUTRA IE 510). In implementations, the inclusion of the optional IRAT-ParametersEUTRA IE implicitly indicates support of EPC, while in other implementations, the inclusion of the optional IRAT-ParametersEUTRA IE implicitly indicates support of 5GC.

Some implementations include an optional SupportedCN-Type field in an IRAT-ParametersEUTRA IE or an IRAT-ParametersEUTRA-Common IE (e.g., SupportedCNType 606, SupportedCNType 614), and set the enumerated type to the supported core network(s).

Some implementations explicitly indicate support of 5GC by including an optional 5GC field in an IRAT-ParametersEUTRA IE or an IRAT-ParametersEUTRA-Commons IE (e.g., 5GC field 708, 5GC field 722, 5GC field 910, 5GC field 922, 5GC field 934, 5GC field 946). In various implementations, the exclusion of the optional 5GC field implicitly indicates no support for 5GC. Alternately or additionally, implementations explicitly indicate support of EPC by including an optional EPC field in an IRAT-ParametersEUTRA IE or an IRAT-ParametersEUTRA-Commons IE (e.g., EPC field 808, EPC field 822, EPC field 908, EPC field 914, EPC field 932, EPC field 938). In various implementations, the exclusion of the optional EPC field implicitly indicates no support for EPC. Thus, at 1110, the UE indicates support of EPC, support of 5GC, and/or support of EPC and 5GC through including and/or excluding IEs and/or fields in IEs as further described.

In some implementations, the UE 110 returns capability information using a MeasAndMobParameters IE, such as MeasAndMobParameters IE 1000 of FIG. 10-1 and/or FIG. 10-2, and indicates in the MeasAndMobParameters IE support, or no support, for core networks. As an example, to explicitly indicate support for an EPC, the UE 110 configures MeasAndMobParameters IE to include an optional handoverLTE-EPC field, such as optional handoverLTE-EPC field 1010 of FIG. 10-1 and/or optional handoverLTE-EPC field 1022 of FIG. 10-2. To implicitly indicate no support for the EPC, the UE 110 excludes the optional handoverLTE-EPC field from the MeasAndMobParameters IE (e.g., handoverLTE-EPC field 1010 and/or optional handoverLTE-EPC field 1022). Alternately or additionally, to explicitly indicate support for a 5GC, the UE 110 configures MeasAndMobParameters IE to include an optional handoverLTE-5GC field, such as optional handoverLTE-5GC field 1012 of FIG. 10-1 and/or optional handoverLTE-5GC field 1024 of FIG. 10-2. To implicitly indicate no support for the EPC, the UE 110 excludes the optional handoverLTE-5GC field from the MeasAndMobParameters IE (e.g., handoverLTE-5GC field 1012 and/or optional handoverLTE-5GC field 1024).

At 1115, the gNB base station 121 generates a measurement configuration for directing the UE 110 to perform one or more measurements, such as that described at 406 of method 400. In implementations, the gNB base station 121 generates the measurement configuration based on the UE-NR-Capability IE. For example, based on determining the UE 110 supports EPC by analyzing the UE-NR-Capability IE, the gNB base station 121 configures the measurement configuration with a EUTRA carrier in a band supported by the UE 110, where the InterRAT-Parameters IE of the UE-NR-Capability IE received from the UE 110 includes the EUTRA carrier in a supportedBandListEUTRA field.

In some implementations, the measurement configuration generated by the gNB base station 121 configures an Absolute Radio Frequency Channel Number (ARFCN) identifying the EUTRA carrier frequency. To illustrate, the base station 121 determines the ARFCN according to the first EUTRA frequency information in the UE-NR-Capability IE. In some implementations, the measurement configuration includes a reporting configuration for storing measurement result(s) generated by the UE 110.

Afterwards, at 1120, the gNB base station 121 sends an NR RRC Reconfiguration to the UE 110, where the NR RRC Reconfiguration includes the measurement configuration generated by the gNB base station 121 at 1115.

At 1125, the UE 110 generates measurement results as directed by the measurement configuration. For example, the UE 110 measures a EUTRA carrier according to the measurement configuration included in the NR RRC Reconfiguration. In implementations, the measurement configuration includes a reporting configuration that enables the UE 110 to transmit measurement report message(s), such as a measurement result from measuring the EUTRA carrier.

Accordingly, in response to generating the measurement results, such as measuring the EUTRA carrier as indicated in the NR RRC Reconfiguration, the UE 110 returns an NR RRC Measurement report to the gNB base station 121 at 1130. In implementations, the NR RRC Measurement report includes the measurement result(s) of the EUTRA carrier as further described.

At 1135, the gNB base station 121 analyzes the measurement result(s) and the capabilities information to determine a handover type for the UE. For example, if the measurement result(s) indicate a EUTRA cell or a EUTRA carrier frequency of an eNB base station has a good signal strength, and the UE-NR-Capability IE indicates the UE supports EPC, the base station 121 determines a handover type that corresponds to performing a handover to an eNB base station. As another example, if the measurement result(s) indicate a EUTRA cell or a EUTRA carrier frequency of a ng-eNB base station has a good signal strength, and the UE-NR-Capability IE indicates the UE supports 5GC, the base station 121 determines a handover type that corresponds to performing a handover to an ng-eNB base station. A handover type can correspond to any suitable combination of handovers, such as a handover type that corresponds to performing a handover to another gNB base station, a handover type that corresponds to performing a handover to a eNB base station, a handover type that corresponds to performing a handover to an ng-eNB base station, etc.

A EUTRA base station, such as an ng-eNB base station, can be connected to EPC and 5GC, where the EUTRA base station supports both. If the measurement result(s) indicate a EUTRA cell or a EUTRA carrier frequency of the EUTRA base station has a signal strength that meets or exceeds a threshold value, and the UE-NR-Capability IE indicates the UE supports both the EPC and the 5GC, the gNB base station 121 determines a handover type that corresponds to performing a handover to an eNB base station or a ng-eNB base station. In some instances, the gNB base station 121 determines the handover type in a dual-support scenario based on priorities (e.g., 5GC has higher priority than EPC, EPC has higher priority than 5GC) and/or system conditions. To illustrate, consider a scenario in which 5GC has priority, then the gNB base station selects a handover type that corresponds to handing the user equipment over to an ng-eNB base station. However, if the ng-eNB base station, or 5GC network node is not functioning and/or is congested, the gNB base station 121 determines to handover the UE to the eNB.

Diagram 1140 included in the signal and control transaction diagram 1100 refers to any combination of the signals and transactions performed between the UE and the gNB base station (e.g., at 1105, at 1110, at 1115, at 1120, at 1125, at 1130, and/or at 1135). Accordingly, references to diagram 1140 correspond to any of the signal and transactions described by the diagram 1100.

Figure 12:
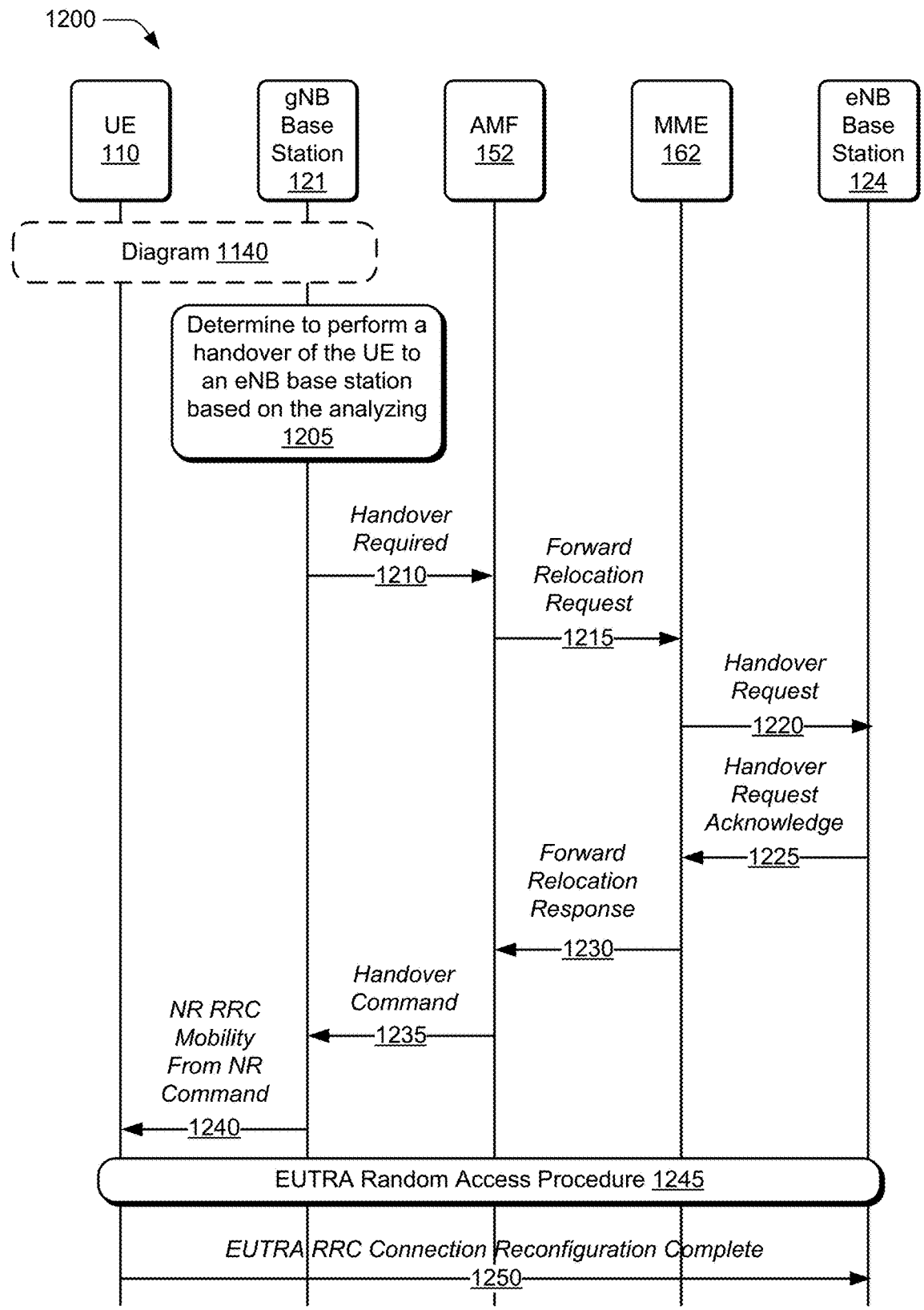
FIG. 12 illustrates an example signal and control transaction diagram associated with handing over a user equipment in an inter-RAT environment based on obtaining capabilities of the user equipment in accordance with various implementations.

Now consider FIG. 12 that illustrates a second example signal and control transaction diagram 1100 that is associated with handing over a user equipment in an inter-RAT environment based on obtaining capabilities of the user equipment in accordance with various implementations. The diagram 1200 illustrates example exchanges between the user equipment 110, gNB base station 121, AMF 152, MME 162, and/or eNB base station 124 of FIG. 1, where the gNB base station 121 determines to perform a handover of the UE 110 to the eNB base station 124 based on a generated measurement configuration and/or obtaining UE capabilities as further described. In implementations, the signal and control transaction diagram 1200 works in conjunction with, wholly or in part, the various IE configurations described with reference to FIGS. 6-1 to 9-2, and/or the signal and control transaction diagram 1100 of FIG. 11.

The signal and control transaction diagram 1200 begins with diagram 1140 of FIG. 11, where the base station 121 and the UE 110 perform various signals and controls transactions to exchange UE capability information and measurement results, such as through sending a UECapabilityEnquiry at 1105, receiving UECapabilityInformation (e.g., UE-NR-Capability IE 500) at 1110, generating a measurement configuration for measuring a EUTRA carrier at 1115, sending the measurement configuration at 1120, measuring the EUTRA carrier at 1125, sending/receiving a measurement report at 1130, and analyzing the measurement report at 1135.

Accordingly, at 1205, the gNB base station 121 determines to perform a handover of the UE 110 to an eNB base station based on the analyzing the measurement results performed at 1135. In other words, the gNB base station determines the handover type based on the analysis. To illustrate, the gNB base station determines a handover type that corresponds to handing the UE over to an eNB base station 124 in response to the UE indicating EPC support, such as by that described at 1110 of FIG. 11. Alternately or additionally, the gNB base station 121 determines a handover type that corresponds to handing the UE 110 over to the eNB base station 124 based upon information included in the NR RRC Measurement report received at 1130. For example, the gNB base station 121 determines to perform a handover the UE 110 to the eNB base station based on a signal strength of the eNB base station, such as a measurement result indicating the signal strength of the eNB base station 124 meets or exceeds a threshold value.

In response to determining to perform a handover of the the UE to the eNB base station, the gNB base station 121 communicates a Handover Required message at 1210 to the AMF 152, such as through an NG interface as described at 102. In implementations, the gNB base station 121 includes a target Global eNB ID (IE) in the Handover Required message, where the target Global eNB ID identifies the eNB base station (e.g., eNB base station 124). In response to receiving the Handover Required message, the AMF 152 forwards the message to MME 162 at 1215, such as through the N26 interface 182 of FIG. 1.

In response to receiving the Handover Required message, the MME 162 forwards a Handover Request message to the eNB base station 124 at 1220. For example, the MME 162 communicates the Handover Request message using an S1 interface as described at 108 of FIG. 1.

Afterwards, and in response to receiving the Handover Request message, the eNB base station 124 replies to the MME 162 with a Handover Request Acknowledge at 1225. At times, the eNB base station 124 communicates the Handover Request Acknowledge to the MME 162 using the S1 interface as described at 108. In some examples, the Handover Request Acknowledge message includes a EUTRA RRC message (e.g., an RRC Connection Reconfiguration message) that orders the UE to perform a handover to a EUTRA cell of the eNB base station 124. The eNB base station 124, for instance, indicates, in the EUTRA RRC message, the core network by inserting "EPC" in the EUTRA RRC message. The MME 162 then forwards a Relocation Response to the AMF 152 at 1230, such as through the N26 interface 182, where the Relocation Response includes the EUTRA RRC message.

At 1235, the AMF 152 sends a Handover Command to the gNB base station 121, such as through an NG interface as described at 102. In implementations, the AMF 152 configures the Handover Command to include the EUTRA RRC message received from the eNB base station 124 (by way of the Relocation Response received from the MME 162).

In response to receiving the Handover Command, the gNB base station 121 sends an NR RC Mobility From NR Command message to the UE 110 at 1240, where the gNB base station inserts the EUTRA RRC message in the NR RC Mobility From NR Command message.

At 1245, and in response to the UE 110 receiving the NR RC Mobility From NR Command message, the various devices within the system (e.g., the UE 110, the gNB base station 121, the AMF 152, the MME 162, and/or the eNB base station 124) perform the EUTRA Random Access Procedure that causes the UE 110 to perform a handover from the gNB base station 121 to the eNB base station 124 according to the EUTRA RRC message in the NR RC Mobility From NR Command message. Afterwards, at 1250, the UE 110 communicates a EUTRA RRC Connection Reconfiguration Complete message to the eNB base station 124.

Figure 13:
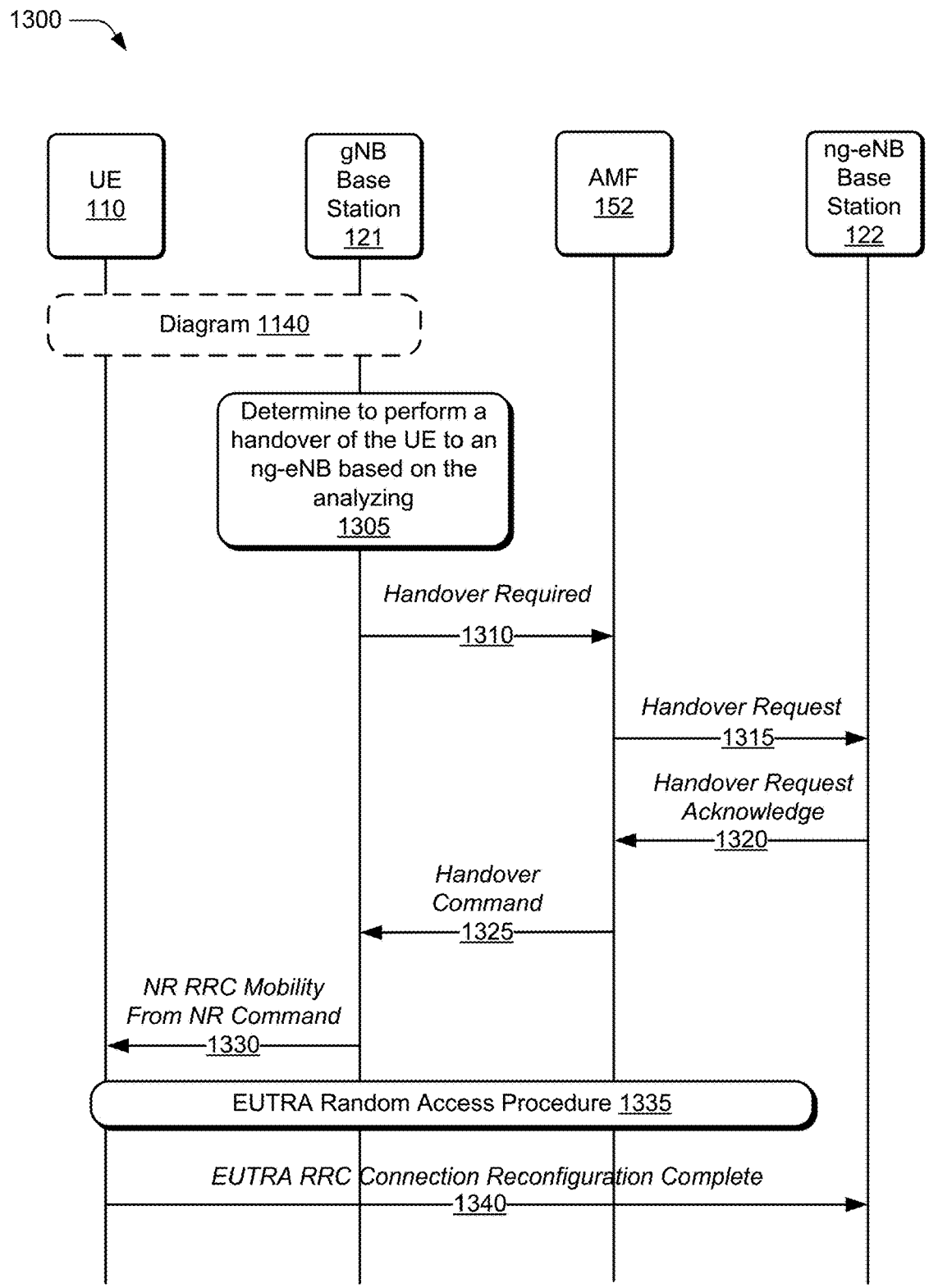
FIG. 13 illustrates an example signal and control transaction diagram associated with handing over a user equipment in an inter-RAT environment based on obtaining the capabilities of a user equipment in accordance with various implementations.

FIG. 13 illustrates a third example signal and control transaction diagram 1300 that is associated with handing over a user equipment in an inter-RAT environment based on obtaining measurement results and capabilities of the user equipment in accordance with various implementations. The diagram 1300 illustrates example exchanges between the user equipment 110, gNB base station 121, AMF 152, and/or ng-eNB base station 122 of FIG. 1, where the gNB base station 121 determines to perform a handover of the UE 110 to the ng-eNB base station 122 based on a generated measurement configuration and/or UE capability information as further described. In implementations, the signal and control transaction diagram 1300 works in conjunction with, wholly or in part, the various IE configurations described with reference to FIGS. 5-10, and/or the signal and control transaction diagram 1100 of FIG. 11.

The signal and control transaction diagram 1300 begins with diagram 1140 of FIG. 11, where the base station 121 and the UE 110 perform various signal and control transactions to exchange UE capability information and measurement results, such as through sending a UECapabilityEnquiry at 1105, receiving UECapabilityInformation (e.g., UE-NR-Capability IE 500) at 1110, generating a measurement configuration for measuring a EUTRA carrier at 1115, sending the measurement configuration at 1120, measuring the EUTRA carrier at 1125, sending/receiving a measurement report at 1130, and analyzing the measurement report at 1135.

Accordingly, at 1305, the gNB base station 121 determines to perform a handover of the UE 110 to the ng-eNB base station 122 based on the analyzing performed at 1135. In other words, the gNB base station determines the handover type based on the analysis. To illustrate, the UE indicates 5GC support in any suitable manner, such as those described at 1110 of FIG. 11, and the gNB base station 121 determines the handover type based on the indication of 5GC support. Alternately or additionally, the gNB base station 121 determines a handover type that corresponds to handing the UE 110 over to the ng-eNB base station 122 based upon information included in the NR RRC Measurement report received at 1130. For example, the gNB base station 121 determines to perform a handover of the UE 110 to the ng-eNB base station based on a measurement result (in the NR RRC Measurement Report) that indicates a signal strength of the ng-eNB base station, such as a measurement result that indicates the signal strength of the ng-eNB base station 122 meets or exceeds a threshold value.

At 1310, the gNB base station 121 communicates the Handover Required message to the AMF 152, such as through an NG interface as described at 102. In turn, at 1315, the AMF 152 forwards a Handover Request to the ng-eNB base station 122, such as through an NG interface as described at 180.

At 1320, the ng-eNB base station 122 replies to the AMF 152 with a Handover Request Acknowledge, such as by sending the Handover Request Acknowledge message through an NG interface described at 180. In some implementations, the Handover Request Acknowledge message includes a EUTRA RRC message (e.g., an RRC Connection Reconfiguration message), where the ng-eNB base station 122 indicates "5GC" in the EUTRA RRC message. Alternately or additionally, the EUTRA RRC message directs the UE to perform a handover to a EUTRA cell of the ng-eNB base station 122.

At 1325, the AMF 152 sends a Handover Command to the gNB base station 121, such as through an NG interface as described at 102. Afterwards, and in response to receiving the Handover Command, the gNB base station 121 sends an NR RC Mobility From NR command to the UE 110 at 1330. In implementations, the gNB base station inserts the EUTRA RRC message into the NR RC Mobility From NR Command message.

Accordingly, at 1335, the various devices within the system (e.g., the UE 110, the gNB base station 121, the AMF 152, and/or the ng-eNB base station 122) perform the EUTRA Random Access Procedure. Further, at 1340, the UE 110 communicates a EUTRA RRC Connection Reconfiguration Complete message to the ng-eNB base station 122, such as through wireless links 132.

Figure 14:
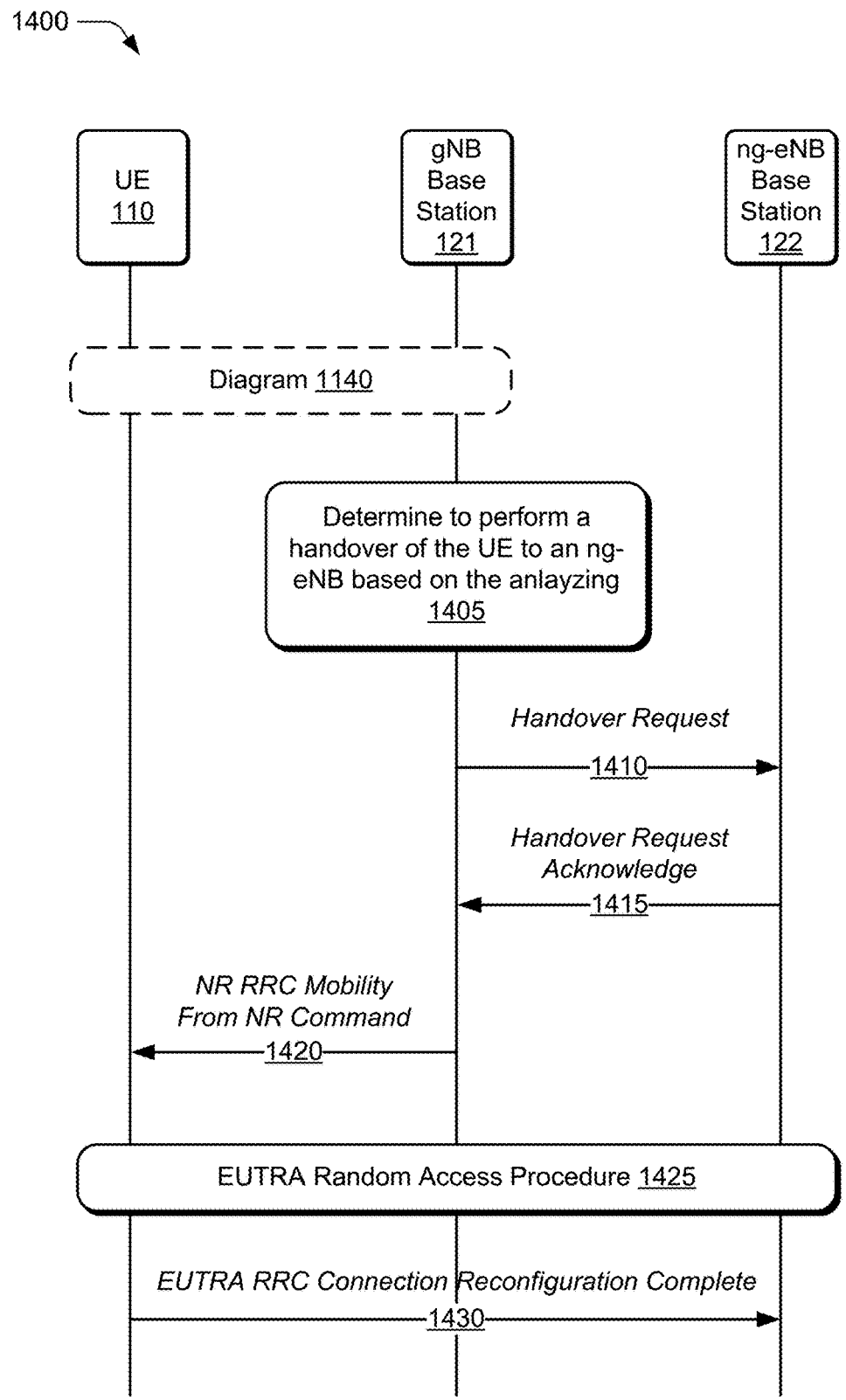
FIG. 14 illustrates an example signal and control transaction diagram associated with managing inter-radio access technology capabilities of a user equipment in accordance with one or more implementations.

FIG. 14 illustrates a fourth example signal and control transaction diagram 1400 that is associated with handing over a user equipment in an inter-RAT environment based on obtaining measurement results and/or capabilities of the user equipment in accordance with various implementations. The diagram 1400 illustrates example exchanges between the user equipment 110, gNB base station 121, and/or ng-eNB base station 122 of FIG. 1, where the gNB base station 121 determines to perform a handover of the UE 110 to the ng-eNB base station 122 based on a generated measurement configuration and/or UE capability information as further described. In implementations, the signal and control transaction diagram 1400 works in conjunction with, wholly or in part, the various IE configurations described with reference to FIGS. 5-10, and/or the signal and control transaction diagram 1100 of FIG. 11.

The signal and control transaction diagram 1400 begins with diagram 1140 of FIG. 11, where the base station 121 and the UE 110 perform various signals and control transactions to exchange UE capability information and measurement results, such as through sending a UECapabilityEnquiry at 1105, receiving UECapabilityInformation (e.g., UE-NR-Capability IE 500) at 1110, generating a measurement configuration for measuring a EUTRA carrier at 1115, sending the measurement configuration at 1120, measuring the EUTRA carrier at 1125, sending/receiving a measurement report at 1130, and analyzing the measurement report at 1135.

Accordingly, at 1405, the gNB base station 121 determines to perform a handover of the UE 110 to the ng-eNB base station 122 in response to the UE indicating 5GC support. In other words, the gNB base station determines the handover type based on the analysis. To illustrate, the UE indicates 5GC support in any suitable manner, such as those described at 1110 of FIG. 11. Alternately or additionally, the gNB base station 121 determines a handover type that corresponds to handing the UE 110 over to the ng-eNB base station 122 based upon information included in the NR RRC Measurement report received at 1130. For example, the gNB base station 121 determines to perform a handover of the UE 110 to the ng-eNB base station based on a measurement result (in the NR RRC Measurement Report) that indicates a signal strength of the ng-eNB base station meets or exceeds a threshold value.

At 1410, the gNB base station 121 communicates a Handover Request to the ng-eNB base station 122 over an Xn interface, such as through an Xn interface similar to the Xn interface described at 103.

At 1415, the ng-eNB base station 122 communicates a Handover Request Acknowledge message to the gNB base station 121, such as through an Xn interface similar to the Xn interface described at 103. In some implementations, the Handover Request Acknowledge message includes a EUTRA RRC message (e.g., an RRC Connection Reconfiguration message), where the ng-eNB base station 122 indicates "5GC" in the EUTRA RRC message. Alternately or additionally, the EUTRA RRC message directs the UE to perform a handover to a EUTRA cell of the ng-eNB base station 122.

At 1420, and in response to receiving the Handover Request Acknowledge, the gNB base station 121 sends an NR RC Mobility From NR Command to the UE 110, where the gNB base station inserts the EUTRA RRC message into the NR RC Mobility From NR Command message. In implementations, the gNB base station 121 transmits the NR RC Mobility From NR Command message using wireless links 131.

Accordingly, at 1425 the various devices within the system (e.g., the UE 110, the gNB base station 121, and/or the ng-eNB base station 122) perform the EUTRA Random Access Procedure. Further, at 1430, the UE 110 communicates a EUTRA RRC Connection Reconfiguration Complete message to the ng-eNB base station 122, such as through wireless links 132.

Figure 15:
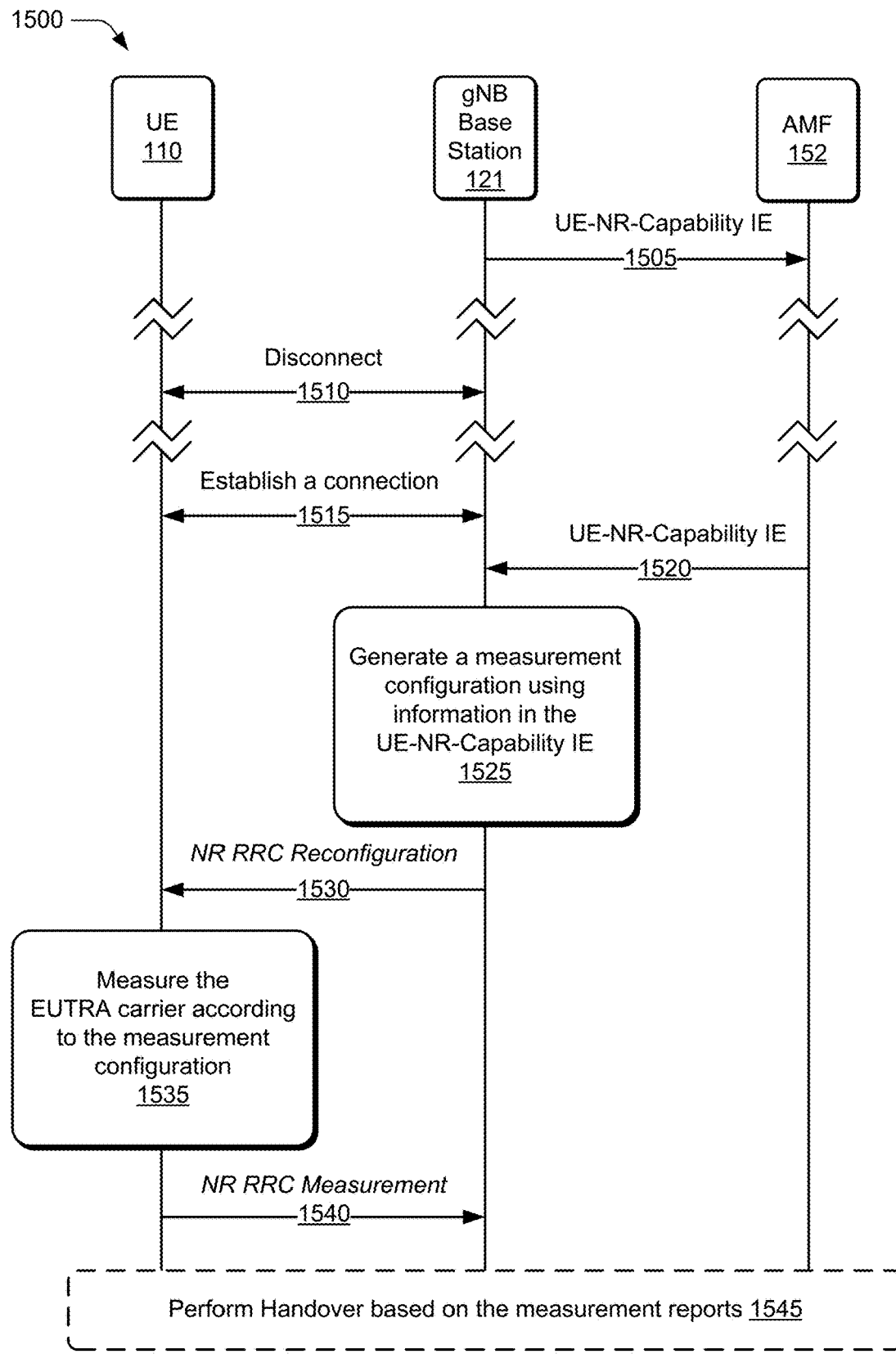
FIG. 15 illustrates an example signal and control transaction diagram associated with handing over a user equipment in an inter-RAT environment based on obtaining the capabilities of a user equipment in accordance with various implementations.

FIG. 15 illustrates a fifth example signal and control transaction diagram 1500 that is associated with handing over a user equipment in an inter-RAT environment based on obtaining capabilities of the user equipment in accordance with various implementations. The diagram 1500 illustrates example exchanges between the user equipment 110, gNB base station 121, and/or the AMF 152 of FIG. 1, where the gNB base station 121 determines to perform a handover of the UE 110 to another base station based on a generated measurement configuration and/or UE capability information as further described. In implementations, the signal and control transaction diagram 1500 works in conjunction with, wholly or in part, the various IE configurations described with reference to FIGS. 5-10, diagram 1100 of FIG. 11, diagram 1200 of FIG. 12, 1300 of FIG. 13, and/or diagram 1400 of FIG. 14.

At 1505, the gNB base station 121 sends a UE-NR-Capability IE to the AMF 152, such as through an NG interface as described at 102, where the UE-NR-Capability IE corresponds to the UE 110. In other words, the UE-NR-Capability IE includes capability information of the UE 110.

In implementations, the gNB base station 121 receives the UE-NR-Capability IE from the UE 110 (not illustrated here), such as through a request and response (e.g., the signal and control transactions described at 1105 and 1110 of FIG. 11). Afterwards, the gNB base station 121 communicates the UE-NR-Capability IE to the AMF 152 as illustrated at 1505. In implementations, the UE-NR-Capability IE includes indication(s) of supported core networks, such as by implicitly and/or explicitly indicating 5GC, EPC, and/or both.

At a first arbitrary point in time later, the UE 110 and the gNB base station 121 disconnect from one another at 1510, such as through a handover, a call drop, a user initiating the disconnect at the UE 110, the UE 110 powering down, etc. At a second arbitrary point in time later, the UE 110 and the gNB base station 121 establish a connection at 1515.

In response to the UE 110 and the gNB base station 121 establishing the connection, the AMF 152 sends the UE-NR-Capability IE to the gNB base station 121 at 1520. To illustrate, as part of establishing the new connection, the gNB base station 121 communicates with the AMF 152, where the communications identify the UE 110 to the AMF 152. In response to the communications, the AMF 152 forwards the UE-NR-Capability IE to the gNB base station 121. In implementations, the UE-NR-Capability IE includes the information received by the AMF 152 at 1505 and corresponds to the capabilities of the UE 110.

For clarity, the signal and control transaction diagram 1500 illustrates the gNB base station 121 acquiring and forwarding the UE-NR-Capability IE to the AMF 152 based upon a first connection with the UE 110 (e.g., at 1505), and then receiving the UE-NR-Capability IE from the AMF based upon establishing a second connection with the UE 110 (e.g., at 1520). However, in alternate implementations, the AMF 152 receives/transmits the UE-NR-Capability IE from/to different base stations. To illustrate, a first base station (e.g., gNB base station 123) can establish a connection to the UE 110, and forward the UE-NR-Capability IE to the AMF, similar to that described at 1505. When a second base station (e.g., gNB base station 121) establishes a connection to the UE 110, the AMF can forward the UE-NR-Capability IE (acquired from the first base station) to the second base station. Thus, while FIG. 15 illustrates gNB base station 121 forwarding and receiving the UE-NR-Capability IE, alternate implementations acquire and forward the UE-NR-Capability IE using different base stations.

At 1525, the gNB base station 121 generates a measurement configuration using information in the UE-NR-Capability IE. For example, the gNB base station configures, in the measurement configuration, a EUTRA carrier in a band supported by the UE by obtaining supported EUTRA band information from the UE-NR-Capability IE. Accordingly, in implementations, the gNB base station generates the measurement configuration based on information received in the UE-NR-Capability IE at 1520. To further illustrate, based on determining the UE 110 supports EPC by analyzing the UE-NR-Capability IE, the gNB base station 121 configures the measurement configuration with a EUTRA carrier in a band supported by the UE 110, where the EUTRA carrier is in a supportedBandListEUTRA field in the InterRAT-Parameters IE of the UE-NR-Capability IE.

Receiving the UE-NR-Capability IE at 1520 allows the gNB base station to generate the measurement configuration without performing communications with the UE 110, such as the communications described at 1105 and at 1110 of FIG. 11. In other words, since the gNB base station 121 receives the UE-NR-Capability IE from the AMF 152 at 1520, the gNB base station 121 proceeds with generating the measurement configuration, instead of requesting the UE-NR-Capability IE from the UE 110. This frees up the resources of the wireless communication system for other devices, and provides the gNB base station with information that can be used to configure a successful handover.

Afterwards, at 1530, the gNB base station 121 sends an NR RRC Reconfiguration to the UE 110, where the NR RRC Reconfiguration includes the measurement configuration generated at 1525 by the gNB base station 121.

At 1535, the UE 110 measures the EUTRA carrier according to the measurement configuration included in the NR RRC Reconfiguration. In implementations, the measurement configuration includes a reporting configuration that the UE 110 uses to transmit measurement report message(s), such as a measurement result based on measuring the EUTRA carrier. Accordingly, in response to measuring the EUTRA carrier as indicated in the NR RRC Reconfiguration, the UE 110 returns an NR RRC Measurement report to the gNB base station 121 at 1540, where the NR RRC Measurement report includes the measurement result(s) of the EUTRA carrier as further described.

At 1545, the wireless communication system (e.g., any combination of devices as illustrated in the environment 100 of FIG. 1) performs a handover based on the measurement reports. For example, in one implementation, the wireless communication system hands the UE 110 over to an eNB base station, such as that described by the signal and control transaction diagram 1200 (e.g., the signal and control transactions described at 1205, 1210, 1215, 1220, 1225, 1230, 1235, 1240, 1245, and 1250). In another implementation, the wireless communication system hands the UE 110 over to an ng-eNB base station using various signal and control transactions, such as that described by the signal and control transaction diagram 1300 (e.g., the signal and control transactions described at 1305, 1310, 1315, 1320, 1325, 1330, 1335, 1340) and/or the signal and control transaction diagram 1400 (e.g., the signal and control transactions described at 1405, 1410, 1415, 1420, 1425, 1430). Accordingly, performing the handover at 1545 can include any combination of devices, such as MME 162, ng-eNB base station 122, and/or eNB base station 124 (not illustrated here).

Figure 16:
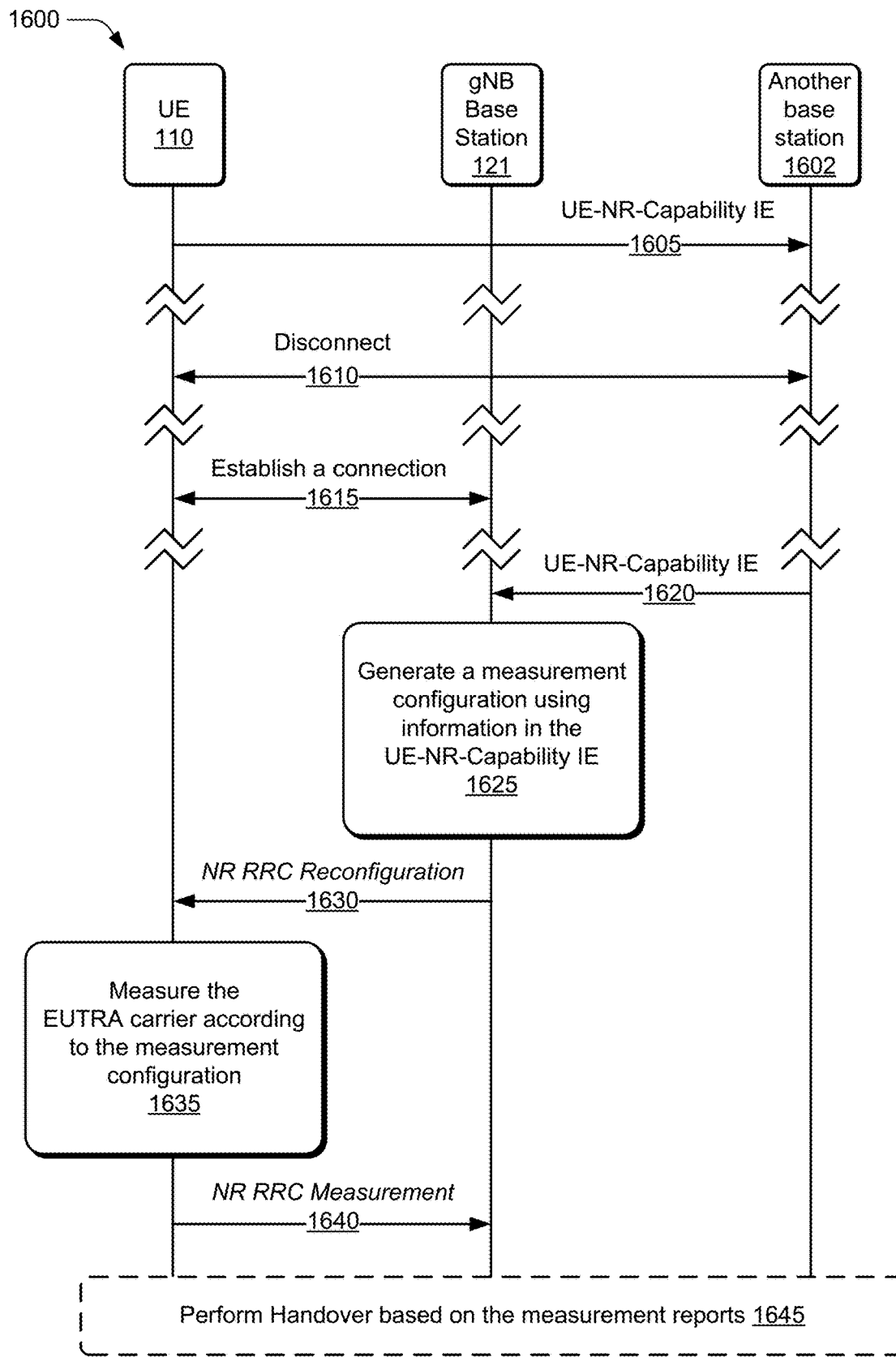
FIG. 16 illustrates an example signal and control transaction diagram associated with handing over a user equipment in an inter-RAT environment based on obtaining the capabilities of a user equipment in accordance with various implementations.

In some implementations, the gNB base station receives the UE-NR-Capability IE from another base station, such as another gNB base station and/or a EUTRA base station (e.g., ng-eNB base station 122, eNB base station 124). To demonstrate, consider now FIG. 16 that illustrates a sixth example signal and control transaction diagram 1600 that is associated with handing over a user equipment in an inter-RAT environment based on obtaining capabilities of the user equipment in accordance with various implementations. The diagram 1600 illustrates example exchanges between the user equipment 110, gNB base station 121, and/or another base station 1502, where the gNB base station 121 determines to perform a handover of the UE 110 to an arbitrary base station based on a generated measurement configuration and/or UE capability information as further described. In implementations, the signal and control transaction diagram 1600 works in conjunction with, wholly or in part, the various IE configurations described with reference to FIGS. 5 to 10, diagram 1100 of FIG. 11, diagram 1200 of FIG. 12, diagram 1300 of FIG. 13, and/or diagram 1400 of FIG. 14.

At 1605, the UE 110 sends a UE-NR-Capability IE to another base station 1602, such as through the wireless links 131 and/or wireless links 132, where the UE-NR-Capability IE includes capability information of the UE 110. In implementations, a gNB base station 123 receives the UE-NR- Capability IE from the UE 110 based on a request and response (e.g., the signal and control transactions described at 1105 and 1110 of FIG. 11). In other implementations, the UE 110 sends the UE-NR-Capability IE to a EUTRA base station (e.g., ng-eNB base station 122, eNB base station 124) in response to receiving a EUTRA RRC message that requests the capability information. As described herein, the UE-NR-Capability IE includes, at times, indication(s) of supported core networks, such as by implicitly and/or explicitly indicating 5GC, EPC, and/or both.

At a first arbitrary point in time later, the UE 110 and the base station 1602 disconnect from one another at 1610, such as through a handover, a call drop, a user initiating the disconnect at the UE 110, the UE 110 powering down, etc. At a second arbitrary point in time later, the UE 110 and the gNB base station 121 establish a connection at 1615.

At a third arbitrary point in time later, at 1620, the gNB base station 121 receives the UE-NR-Capability IE from the base station 1602, such as through the Xn interface described at 103 and/or at 105. In implementations, the UE-NR-Capability IE includes the information received by the base station 1602 at 1605 and corresponds to the capabilities of the UE 110. In some implementations, the gNB base station 121 receives the UE-NR-Capability IE from the gNB base station 123 in a Handover Request message, in a UE Context message, and so forth. In other implementations, the gNB base station 121 receives the UE-NR-Capability IE from a EUTRA base station directly through the Xn interface described at 105, or indirectly through core networks.

To illustrate, in one example, the base station 1602 sends a Handover Request message including the UE-NR-Capability IE to the 5G NR base station via an Xn interface, such as when the base station 1602 corresponds to the ng-eNB base station 122.

In another example, the base station 1602 sends a Handover Required message including the UE-NR-Capability IE to the AMF 152 using an NG interface described at 180, such as when the base station 1502 corresponds to ng-eNB base station 122. In turn, the AMF 152 sends a Handover Request message including the UE-NR-Capability IE to the gNB base station 121 using the NG interface described at 102.

In a further example, the base station 1602 sends a Handover Required message including the UE-NR-Capability IE to the MME 162 using the S1 interface described at 108, where the base station 1602 corresponds to the eNB base station 124. The MME 162 then sends a Forward Relocation Request message including the UE-NR-Capability IE to the AMF 152, such as that described at 1230 of FIG. 21. The AMF 152 then sends a Handover Request message including the UE-NR-Capability IE to the gNB base station 121 using the NG interface described at 102.

At 1625, the gNB base station 121 generates a measurement configuration using information in the UE-NR-Capability IE. For example, the gNB base station configures, in the measurement configuration, a EUTRA carrier in a band supported by the UE by obtaining supported EUTRA band information from the UE-NR-Capability IE. Accordingly, in implementations, the gNB base station generates the measurement configuration based on information received in the UE-NR-Capability IE at 1620. To further illustrate, based on determining the UE 110 supports EPC by analyzing the UE-NR-Capability IE, the gNB base station 121 configures the measurement configuration with a EUTRA carrier in a band supported by the UE 110, where the EUTRA carrier is in a supportedBandListEUTRA field in the InterRAT-Parameters IE of the UE-NR-Capability IE.

Receiving the UE-NR-Capability IE at 1620 allows the gNB base station generate the measurement configuration without performing communications with the UE 110, such as the communications described at 1105 and at 1110 of FIG. 11. In other words, since the gNB base station 121 receives the UE-NR-Capability IE from the base station 1602 at 1620, the gNB base station 121 proceeds with generating the measurement configuration, instead of requesting the UE-NR-Capability IE from the UE 110, thus freeing up resources of the wireless communication system for other devices and/or communications.

Afterwards, at 1630, the gNB base station 121 sends an NR RRC Reconfiguration to the UE 110, where the NR RRC Reconfiguration includes the measurement configuration generated by the gNB base station 121 at 1625.

At 1635, the UE 110 measures the EUTRA carrier according to the measurement configuration included in the NR RRC Reconfiguration. In implementations, the measurement configuration includes a reporting configuration that the UE 110 uses to transmit measurement report message(s), such as a measurement result of measuring the EUTRA carrier. Accordingly, in response to measuring the EUTRA carrier as indicated in the NR RRC Reconfiguration, the UE 110 returns an NR RRC Measurement report to the gNB base station 121 at 1640, where the NR RRC Measurement report includes the measurement result(s) based on measuring the EUTRA carrier as further described.

At 1645, the wireless communication system (e.g., any combination of devices as illustrated in the environment 100 of FIG. 1) performs a handover based on the measurement reports. For example, in one implementation, the wireless communication system hands the UE 110 over to an eNB base station, such as that described by the signal and control transaction diagram 1200 (e.g., the signal and control transactions described at 1205, 1210, 1215, 1220, 1225, 1230, 1235, 1240, 1245, and 1250). In another implementation, the wireless communication system hands the UE 110 over to an ng-eNB base station using various signal and control transactions, such as that described by the signal and control transaction diagram 1300 (e.g., the signal and control transactions described at 1305, 1310, 1315, 1320, 1325, 1330, 1335, 1340) and/or the signal and control transaction diagram 1400 (e.g., the signal and control transactions described at 1405, 1410, 1415, 1420, 1425, 1430). Accordingly, performing the handover at 1645 can include any combination of devices, such as AMF 152, MME 162, ng-eNB base station 122, and/or eNB Base station 124 (not illustrated here).

Having described example signal and control transactions that can be used to manage inter-radio access technology capabilities of a user equipment, consider now some example methods that are in accordance with one or more implementations.

Example Methods

Example methods 1700 and 1800 are described with reference to FIG. 17 and FIG. 18 in accordance with one or more aspects of managing inter-radio access technology capabilities of a user equipment. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 17:
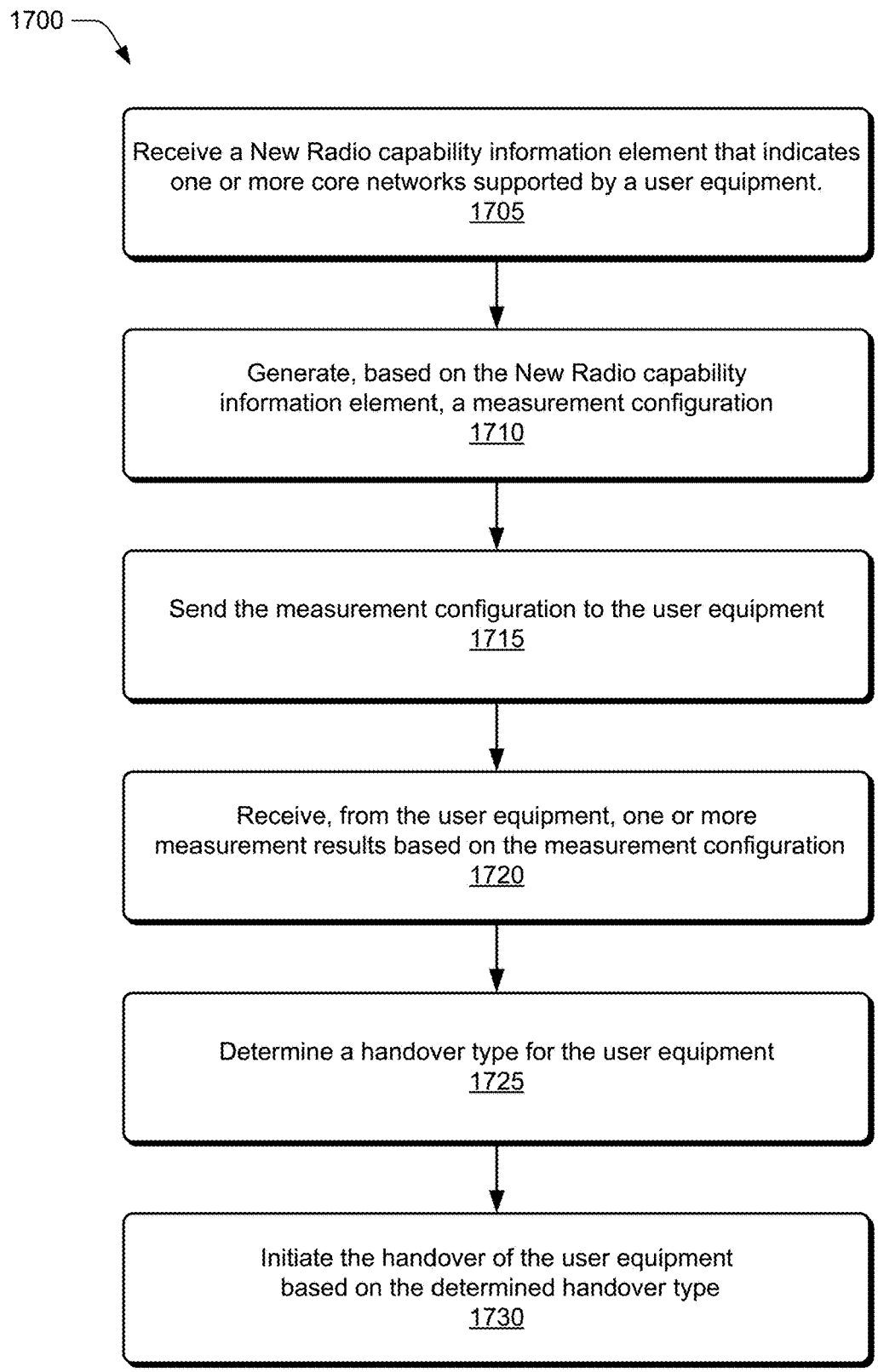
FIG. 17 illustrates an example method for managing inter-RAT technology capabilities of a user equipment.

FIG. 17 illustrates an example method 1700 for managing inter-radio access technology capabilities of a user equipment. In some implementations, operations of the method 1700 are performed by a base station, such as base station 121 of FIG. 1.

At 1705, a base station receives a New Radio capability information element that indicates one or more core networks supported by a user equipment. For example, a base station (e.g., gNB base station 121) receives a UE-NR-Capabilities IE (e.g., UE-NR-Capabilities IE 500) from a UE (e.g., UE 110) in response to sending the UE a request, such as that described with reference to diagram 1100 of FIG. 11. As another example, the base station receives the UE-NR-Capabilities IE from an AMF (e.g., AMF 152), such as that described with reference to diagram 1500 of FIG. 15. As yet another example, the base station receives the UE-NR-Capabilities IE from another base station, such as that described with reference to diagram 1600 of FIG. 16. In some implementations, the base station receives a MeasAndMobParameters IE, such as that described with reference to FIG. 10-1 and/or FIG. 10-2, and determines the core networks supported by the UE based upon the inclusion and/or exclusion of optional fields (e.g., optional handoverLTE-EPC field 1010, optional handoverLTE-EPC field 1022, optional handoverLTE-5GC 1012, optional handoverLTE-5GC field 1024).

At 1710, the base station generates, based on the New Radio capability information element, a measurement configuration. The base station (e.g., base station 121), for example, generates a measurement configuration by identifying, from the New Radio capability information element, an evolved universal terrestrial radio access carrier frequency supported by the user equipment. To illustrate, in some implementations, the base station determines an ARFCN according to EUTRA frequency information included the UE-NR-Capability IE. The base station then forms the measurement configuration based on the evolved universal terrestrial radio access carrier frequency supported by the user equipment. Alternately or additionally, in generating the measurement configuration, the base station identifies core networks supported by the user equipment, such as by identifying explicit information and/or implicit information included in the New Radio capability information element, such as those described with reference to FIGS. 5 through 10.

At 1715, the base station sends the measurement configuration to the user equipment. For instance, the base station (e.g., gNB base station 121) sends an NR RRC Reconfiguration message to the UE (e.g., UE 110) over wireless links, such as that described at 1110 of FIG. 11, where the NR RRC Reconfiguration message includes the measurement configuration. In some implementations, the base station includes a reporting configuration in the measurement configuration for storing measurement results.

At 1720, the base station receives, from the user equipment, one or more measurement results based on the measurement configuration. The base station (e.g., gNB base station 121) receives, at times, an NR RRC measurement report from the UE (e.g., UE 110), where the measurement report includes measurement results, such as measurements of the EUTRA carriers identified in the measurement configuration, signal strengths of base stations, etc.

At 1725, the base station determines a handover type for the user equipment. In various implementations, the base station (e.g., gNB base station 121) determines the handover type based on the measurement reports and/or the one or more core networks (e.g., 5GC 150, EPC 160) supported by the UE (e.g., UE 110). To illustrate, in at least one implementation, the base station determines a handover type that corresponds to handing the UE over to an eNB base station (e.g., eNB base station 124) based on the UE indicating (implicitly or explicitly) support for EPC and/or a signal strength measurement of the eNB base station indicating the signal strength meets or exceeds a threshold value, such as that described with reference to diagram 1200 of FIG. 12. As another example, the base station determines a handover type that corresponds to handing the UE over to an ng-eNB base station (e.g., ng-eNB base station 122) based on the UE indicating (implicitly or explicitly) support for 5GC and/or a signal strength measurement of the ng-eNB base station indicating the signal strength meets or exceeds a threshold value, such as that described with reference to diagram 1300 of FIG. 13 or diagram 1400 of FIG. 14.

In implementations, the base station identifies supported core networks by analyzing the New Radio capability information element to determine whether the capability information element includes an optional information element. The base station then determines the user equipment supports a first core network of the one or more core networks based on a presence of the optional information element (e.g., the optional information element is present in the IE). In a first implementation, the presence of the optional information element implicitly indicates support of EPC. In a second implementation, the presence of the optional information element implicitly indicates support of 5GC. In some implementations, the base station determines whether the UE supports a second core network by determining whether the New Radio capability information element includes an optional field. For example, in various implementations, the base station determines that the user equipment supports the second core network when the optional field is present in the New Radio capability information element, and determines that the user equipment does not support the second core network when the optional field is not present.

At 1730, the base station initiates the handover of the user equipment based on the determined handover type. For instance, the base station (e.g., gNB base station 121) sends a Handover Required message to an AMF (e.g., AMF 152) and/or sends a Handover Request to an ng-eNB base station, such as that described with reference to diagram 1200 of FIG. 12, diagram 1300 of FIG. 13, and/or diagram 1400 of FIG. 14.

Figure 18:
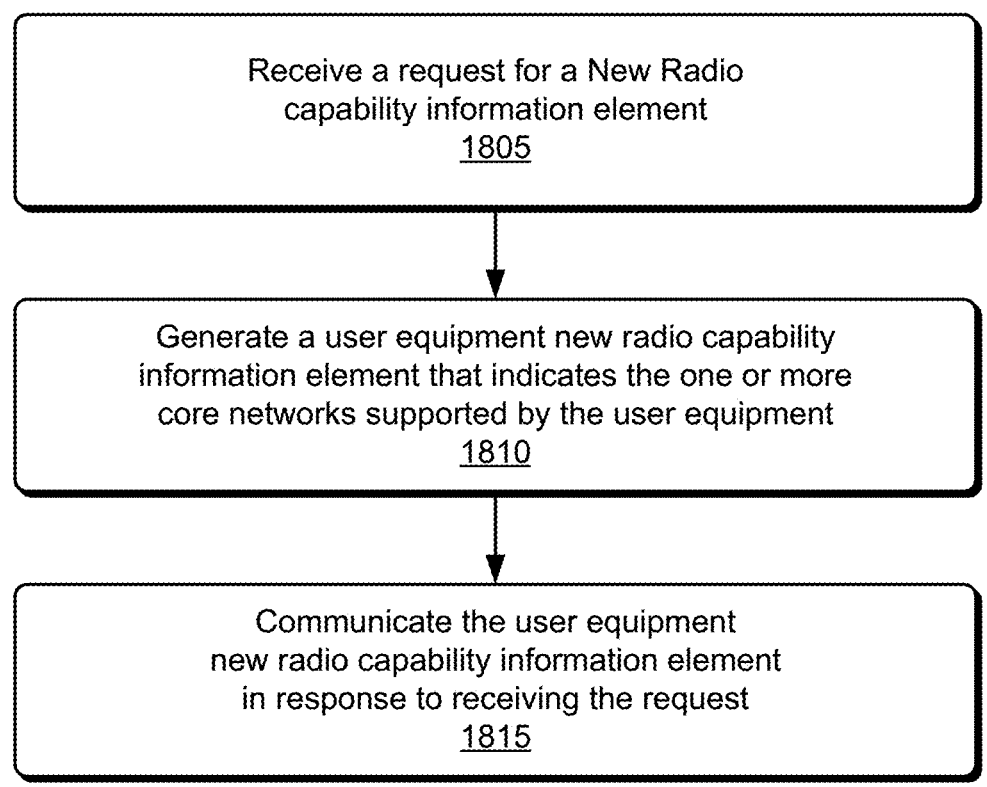
FIG. 18 illustrates an example method for managing inter-RAT technology capabilities of a user equipment.

FIG. 18 illustrates an example method 1800 for managing inter-radio access technology capabilities of a user equipment. In some implementations, operations of the method 1800 are performed by a user equipment, such as user equipment 110 of FIG. 1.

At 1805, a user equipment receives a request for a New Radio capability information element, such as a UE-NR-Capability IE, a MeasAndMobParameters IE, etc. To illustrate, the UE (e.g., UE 110) receives the request (e.g., a UECapabilityEnquiry) from a base station (e.g., gNB base station 121), such as that described with reference to diagram 1100 of FIG. 11. Alternately or additionally, the UE receives the request from an eNB base station or an ng-eNB base station (e.g., EUTRA RRC message).

At 1810, the user equipment generates a user equipment New Radio capability information element that indicates the one or more core networks supported by the user equipment. In one or more implementations, the UE (e.g., UE 110) generates a UE-NR-Capability IE (e.g., UE-NR-Capability IE 500), and indicates support for a first core network of the core networks (e.g., 5GC or EPC) implicitly by including an optional inter-radio access technology parameters information element (e.g., Inter-RAT-Parameters IE 506) within the UE-NR-Capability IE. Alternately or additionally, the UE indicates support, or no support, for a second core network of the core networks (e.g., EPC or 5GC) by including an optional core network field within the user equipment New Radio capability information element to explicitly indicate support, or excluding the optional core network field to implicitly indicate no support. As yet another example, the user equipment generates a MeasAndMobParameters IE, such as that described with reference to FIG. 10-1 and/or FIG. 10-2, and indicates the supported and/or unsupported the core networks through the inclusion and/or exclusion of optional fields (e.g., optional handoverLTE-EPC field 1010, optional handoverLTE-EPC field 1022, optional handoverLTE-5GC 1012, optional handoverLTE-5GC field 1024). In various implementations, the UE configures the UE-NR-Capability IE and/or the MeasAndMobParameters IE in manners similar to those described with reference to FIGS. 5 through 10 to explicitly or implicitly indicate the supported (and/or unsupported) core networks.

In some implementations, the user equipment New Radio capability information element Ne includes one or more fields that indicate one or more radio capabilities of the user equipment. To illustrate, in generating the user equipment New Radio capability information element, some implementations of the UE include an indication of one or more evolved universal terrestrial radio access carrier frequencies supported by the user equipment in the one or more fields that indicate the one or more radio capabilities.

Afterwards, at 1815, the user equipment communicates the user equipment New Radio capability information element in response to receiving the request. For instance, the UE (e.g., UE 110) communicates a UE-NR-Capability IE to a base station (e.g., gNB base station 121, eNB base station 124, ng-eNB base station 122) over wireless links.

Although aspects of managing inter-radio access technology capabilities of a user equipment have been described in language specific to features and/or methods, the subject of the appended claims is not necessarily limited to the specific features or methods described. Rather, the specific features and methods are disclosed as example implementations of managing inter-radio access technology capabilities of a user equipment, and other equivalent features and methods are intended to be within the scope of the appended claims. Further, various different aspects are described, and it is to be appreciated that each described aspect can be implemented independently or in connection with one or more other described aspects.

In the following, several examples are described.

Example 1

A method performed by a base station for performing a handover of a user equipment, the method comprising: receiving, by the base station, a New Radio capability information element that indicates one or more core networks supported by the user equipment; generating, based on the New Radio capability information element, a measurement configuration; sending the measurement configuration to the user equipment; receiving, from the user equipment, one or more measurement results based on the measurement configuration; determining, based on the one or more core networks supported by the user equipment and the one or more measurement results, a handover type for the user equipment; and initiating the handover of the user equipment based on the determined handover type.

Example 2

The method as recited in example 1, wherein the New Radio capability information element includes an information element that indicates one or more radio capabilities of the user equipment, wherein the generating the measurement configuration further comprises: identifying, from the one or more radio capabilities in the New Radio capability information element, an evolved universal terrestrial radio access carrier frequency supported by the user equipment; and forming the measurement configuration based on the evolved universal terrestrial radio access carrier frequency supported by the user equipment.

Example 3

The method as recited in example 1 or example 2, wherein the determining the handover type comprises identifying, from the New Radio capability information element, that the user equipment supports a fifth-generation core network, and wherein determining the handover type comprises determining a handover type that corresponds to handing over the user equipment to a next-generation evolved node B base station.

Example 4

The method as recited in example 1 or example 2, wherein the determining the handover type comprises identifying, from the New Radio capability information element, the user equipment supports a fifth-generation core network, and wherein determining the handover type comprises determining a handover type that corresponds to handing over the user equipment to a next-generation node B base station.

Example 5

The method as recited in example 1 or example 2, wherein the determining the handover type comprises identifying, from the New Radio capability information element, that the user equipment supports an evolved packet core network, and wherein determining the handover type comprises determining a handover type that corresponds to handing over the user equipment to a next-generation evolved node B base station.

Example 6

The method as recited in example 1 or example 2, wherein the determining the handover type comprises identifying, from the New Radio capability information element, the user equipment supports an evolved packet core network, and wherein determining the handover type comprises determining a handover type that corresponds to handing over the user equipment to a evolved node B base station.

Example 7

The method as recited any one of the examples 3 to 6, wherein the determining the handover type further comprises: obtaining one or more signal strength measurements from the measurement results; and determining the handover type based on the one or more signal strength measurements.

Example 8

The method as recited in example 1 or example 2, wherein the determining the handover type comprises identifying, from the New Radio capability information element, the user equipment supports both a fifth-generation core network and an evolved packet core network, and wherein determining the handover type comprises determining the handover type based on priorities or system conditions.

Example 9

The method as recited in any one of the preceding examples, wherein the base station comprises a first base station, and wherein receiving the New Radio capability information element comprises receiving the New Radio capability information element from a second base station.

Example 10

The method as recited in any one of the preceding examples, wherein the method further comprises requesting the New Radio capability information element from the user equipment, and wherein receiving the New Radio capability information element comprises receiving the New Radio capability information element from the user equipment.

Example 11

The method as recited in any one of the preceding examples, the method further comprising: analyzing the New Radio capability information element to determine whether the New Radio capability information element includes an optional information element; determining the user equipment supports a first core network of the one or more core networks based on a presence of the optional information element; determining whether the New Radio capability information element includes an optional field; and determining whether the user equipment supports a second core network of the one or more core networks based on whether the optional field is present in the New Radio capability information element.

Example 12

A method performed by a user equipment for indicating capability information of the user equipment, the method comprising: receiving, by the user equipment, a request for a New Radio capability information element; generating a user equipment New Radio capability information element that indicates one or more core networks supported by the user equipment; and communicating the user equipment New Radio capability information element in response to receiving the request.

Example 13

The method as recited in example 12, wherein the generating the user equipment New Radio capability information element comprises indicating support for a first core network of the one or more core networks implicitly by including an optional information element within the user equipment New Radio capability information element.

Example 14

The method as recited in example 13, wherein the generating the user equipment New Radio capability information element comprises indicating support for a second core network of the one or more core networks explicitly by including an optional core network field within the user equipment New Radio capability information element.

Example 15

The method as recited in example 13, wherein the generating the user equipment New Radio capability information element comprises implicitly indicating no support for a second core network of the one or more core networks by excluding an optional field within the user equipment New Radio capability information element.

Example 16

The method as recited in any one of the preceding claims, wherein the user equipment New Radio capability information element includes one or more fields that indicate one or more radio capabilities of the user equipment, and wherein the generating the user equipment New Radio capability information element comprises including an indication of one or more evolved universal terrestrial radio access carrier frequencies supported by the user equipment in the one or more fields that indicate the one or more radio capabilities.

Example 17

The method as recited in any one of examples 13 through 16, wherein the first core network comprises an evolved packet core network.

Example 18

The method as recited in any one of examples 13 through 16, wherein the first core network comprises a fifth-generation core network.

Example 19

A base station comprising: a wireless transceiver; a processor; and computer-readable storage media comprising instructions that, responsive to execution by the processor, direct the base station to perform any one of the methods of examples 1 to 11.

Example 20

A user equipment comprising: a wireless transceiver; a processor; and computer-readable storage media comprising instructions that implement a capability manager that, responsive to execution by the processor, directs the user equipment to perform one of the methods of examples 12 to 18.

What is claimed is:
1. A method performed by a base station for performing a handover of a user equipment, the method comprising:

receiving, by the base station, a New Radio capability information message;
analyzing a New Radio capability information element in the New Radio capability information message to determine whether the New Radio capability information element includes one or more of:
  a first optional core network fields indicating that the user equipment supports an inter-radio-access-technology (inter-RAT) handover to an evolved universal terrestrial radio access (EUTRA) base station connected to a fifth-generation core (5GC) network; or
  a second optional core network field indicating that the user equipment supports an inter-RAT handover to a EUTRA base station connected to an evolved packet core (EPC) network;
determining whether the user equipment supports an inter-RAT handover to one or more of: a EUTRA base station connected to the 5GC network or a EUTRA base station connected to the EPC network based on whether the New Radio capability information element includes one or more of: the first optional core network field or the second optional core network field, respectively;
generating, based on the New Radio capability information element, a measurement configuration;
sending the measurement configuration to the user equipment;
receiving, from the user equipment, one or more measurement results based on the measurement configuration;
determining, based on whether the user equipment supports an inter-RAT handover to one or more of: a EUTRA base station connected to the 5GC network or a EUTRA base station connected to the EPC network and the one or more measurement results, a handover type for the user equipment; and
initiating the handover of the user equipment based on the determined handover type.

2. The method as recited in claim 1, further comprising:
analyzing the New Radio capability information element to determine one or more radio capabilities of the user equipment; and
identifying, based on the one or more radio capabilities of the user equipment, an evolved universal terrestrial radio access carrier frequency supported by the user equipment,
wherein the generating the measurement configuration is further based on the evolved universal terrestrial radio access carrier frequency supported by the user equipment.

3. The method as recited in claim 1, wherein:
the determining whether the user equipment supports an inter-RAT handover to one or more of: a EUTRA base station connected to the 5GC network or a EUTRA base station connected to the EPC network comprises:
  determining that the user equipment supports an inter-RAT handover to a EUTRA base station connected to the 5GC network based on the New Radio capability information element including the first optional core network field; and
the determining the handover type comprises determining a handover type that corresponds to handing over the user equipment to a next-generation evolved node B base station.

4. The method as recited in claim 3, further comprising:
obtaining, based on the one or more measurement results, one or more signal strength measurements;

wherein the determining the handover type is based further on the one or more signal strength measurements.

5. The method as recited in claim 1, wherein:
the determining whether the user equipment supports an inter-RAT handover to one or more of: a EUTRA base station connected to the 5GC network or a EUTRA base station connected to the EPC network comprises:
  determining that the user equipment supports an inter-RAT handover to a EUTRA base station connected to the 5GC network and a EUTRA base station connected to the EPC network based on the New Radio capability information element including the first optional core network field and the second optional core network field; and
the determining the handover type is based further on priorities or system conditions.

6. The method as recited in claim 1,
wherein the receiving the New Radio capability information message comprises receiving the New Radio capability information message from another base station.

7. The method as recited in claim 1, further comprising:
requesting the New Radio capability information message from the user equipment,
wherein the receiving the New Radio capability information message comprises receiving the New Radio capability information message from the user equipment.

8. The method as recited in claim 1, wherein:
the determining whether the user equipment supports an inter-RAT handover to one or more of: a EUTRA base station connected to the 5GC network or a EUTRA base station connected to the EPC network comprises:
  determining that the user equipment supports an inter-RAT handover to a EUTRA base station connected to the EPC network based on the New Radio capability information element including the second optional core network field; and
the determining the handover type comprises determining a handover type that corresponds to handing over the user equipment to an evolved node B base station.

9. A method performed by a user equipment for indicating capability information of the user equipment, the method comprising:
receiving, by the user equipment, a request for a New Radio capability information message;
generating a user equipment New Radio capability information message by including, in the New Radio capability information message, at least one of:
  a first optional core network fields indicating that the user equipment supports an inter-radio-access-technology (inter-RAT) handover to an evolved universal terrestrial radio access (EUTRA) base station connected to a fifth generation core (5GC) network; or
  a second optional core network field indicating that the user equipment supports an inter-RAT handover to a EUTRA base station connected to an evolved packet core (EPC) network; and
communicating the user equipment New Radio capability information message in response to receiving the request.

10. The method as recited in claim 9,
wherein the generating the user equipment New Radio capability information message comprises including an indication of one or more radio capabilities.

11. The method as recited in claim 10, wherein the including the indication of the one or more radio capabilities comprises including an indication of an evolved universal terrestrial radio access carrier frequency supported by the user equipment.

12. The method as recited in claim 9, wherein the generating the user equipment New Radio capability information element comprises:
excluding the first optional core network field or the second optional core network field in the user equipment New Radio capability information message to indicate the user equipment does not support an inter-RAT handover to a EUTRA base station being connected to the 5GC network or the EPC network, respectively.

13. The method as recited in claim 9, wherein the generating the user equipment New Radio capability information message comprises:
including the first optional core network field and the second optional core network field in the user equipment New Radio capability information message to indicate the user equipment supports an inter-RAT handover to a EUTRA base station being connected to the 5GC network and a EUTRA base station being connected to the EPC network.

14. A base station comprising:
a wireless transceiver;
a processor; and
computer-readable storage media comprising instructions that, responsive to execution by the processor, direct the base station to perform operations comprising:
receiving a New Radio capability information message;
analyzing a New Radio capability information element in the New Radio capability information message to determine whether the New Radio capability information element includes one or more of:
a first optional core network field indicating that a user equipment supports an inter-radio-access-technology (inter-RAT) handover to an evolved universal terrestrial radio access (EUTRA) base station connected to a fifth-generation core (5GC) network; or
a second optional core network field indicating that the user equipment supports an inter-RAT handover to a EUTRA base station connected to an evolved packet core (EPC) network;
determining whether the user equipment supports an inter-RAT handover to one or more of: a EUTRA base station connected to the 5GC network or a EUTRA base station connected to the EPC network based on whether the New Radio capability information element includes one or more of: the first optional core network field or the second optional core network field, respectively;
generating, based on the New Radio capability information element, a measurement configuration;
sending the measurement configuration to the user equipment;
receiving, from the user equipment, one or more measurement results based on the measurement configuration;
determining, based on whether the user equipment supports an inter-RAT handover to one or more of: a EUTRA base station connected to the 5GC network or a EUTRA base station connected to the EPC network and the one or more measurement results, a handover type for the user equipment; and
initiating a handover of the user equipment based on the determined handover type.

15. The base station as recited in claim 14, wherein the operations further comprise:
analyzing the New Radio capability information element to determine one or more radio capabilities of the user equipment; and
identifying, based on the one or more radio capabilities of the user equipment, an evolved universal terrestrial radio access carrier frequency supported by the user equipment,
wherein the generating the measurement configuration is further based on the evolved universal terrestrial radio access carrier frequency supported by the user equipment.

16. The base station as recited in claim 14, wherein:
the determining whether the user equipment supports an inter-RAT handover to one or more of: a EUTRA base station connected to the 5GC network or a EUTRA base station connected to the EPC network comprises:
determining that the user equipment supports an inter-RAT handover to a EUTRA base station connected to the 5GC network based on the New Radio capability information element including the first optional core network field; and
the determining the handover type comprises determining a handover type that corresponds to handing over the user equipment to a next-generation evolved node B base station.

17. The base station as recited in claim 14, wherein:
the determining whether the user equipment supports an inter-RAT handover to one or more of: a EUTRA base station connected to the 5GC network or a EUTRA base station connected to the EPC network comprises:
determining that the user equipment supports an inter-RAT handover to a EUTRA base station connected to the 5GC network and a EUTRA base station connected to the EPC network based on the New Radio capability information element including the first optional core network field and the second optional core network field; and
the determining the handover type is based further on priorities or system conditions.

18. The base station as recited in claim 14, wherein:
the determining whether the user equipment supports an inter-RAT handover to one or more of: a EUTRA base station connected to the 5GC network or a EUTRA base station connected to the EPC network comprises:
determining that the user equipment supports an inter-RAT handover to a EUTRA base station connected to the EPC network based on the New Radio capability information element including the second optional core network field; and
the determining the handover type comprises determining a handover type that corresponds to handing over the user equipment to an evolved node B base station.

19. The base station as recited in claim 14, wherein the receiving the New Radio capability information message comprises receiving the New Radio capability information message from another base station.

20. The base station as recited in claim 14, wherein the operations further comprise:
requesting the New Radio capability information message from the user equipment,
wherein the receiving the New Radio capability information message comprises receiving the New Radio capability information message from the user equipment.

* * * * *